United States Patent [19]
Iwata et al.

[11] Patent Number: 5,371,649
[45] Date of Patent: Dec. 6, 1994

[54] METHOD AND APPARATUS FOR CORONA DISCHARGE PROCESSING

[75] Inventors: Akinori Iwata; Makoto Moriyama; Kouichi Kuwano; Kensuke Akutsu; Koji Ueki, all of Osaka; Ikuo Tochizawa, Hyogo; Hirohiko Koge, Hiroshima; Takanori Hara, Hiroshima; Yuji Tanaka, Hiroshima; Masatoshi Fujii, Hiroshima, all of Japan

[73] Assignees: Nippon Paint Co., Ltd., Osaka; Mazda Motor Corporation, Aki, both of Japan

[21] Appl. No.: 72,988

[22] Filed: Jun. 7, 1993

[30] Foreign Application Priority Data

Jun. 10, 1992 [JP] Japan .................................. 4-150904
Jun. 11, 1992 [JP] Japan .................................. 4-152059

[51] Int. Cl.5 ........................ H01T 19/04; B29C 35/00
[52] U.S. Cl. ................................ 361/225; 250/324; 355/219
[58] Field of Search ............... 355/219, 224; 361/225; 204/164, 165; 264/26-27; 250/324, 325

[56] References Cited

U.S. PATENT DOCUMENTS 3,668,097  6/1972  Eisby ..................... 204/165
4,836,901  6/1989  Manabe et al. ............ 204/164

FOREIGN PATENT DOCUMENTS 0228247  7/1987  European Pat. Off. .
0275693  7/1988  European Pat. Off. .
7613034  11/1976  France .
47-4890  3/1972  Japan .
57-119931  7/1982  Japan .
62-57431  3/1987  Japan .
4-328135  11/1992  Japan .
4328135  11/1992  Japan .
1525156  9/1978  United Kingdom .

Primary Examiner—A. D. Pellinen
Assistant Examiner—Aditya Krishnan
Attorney, Agent, or Firm—Armstrong, Westerman, Hattori, McLeland & Naughton

[57] ABSTRACT

In a method of corona discharge processing of resin formings surface, excellent corona discharge processing is possible, even if there is a distance between the resin formings and the discharge electrode, by generating a high voltage pulse having a pulse width of 1 $\mu$s or more, an average electric field strength of 4 to 20 kv/cm denoted by applied voltage (wave height) versus inter-electrode distance, and a pulse frequency of 10 pps or more. This processing is performed by the apparatus which comprises arranging a transfer conveyor to transfer the resin formings, a counter-electrode placed in a down side of the transfer conveyor, a dielectric to cover a surface of the counter-electrode, and a number of discharge electrodes which are arranged in a definite distance above the resin formings along the transfer route.

12 Claims, 15 Drawing Sheets

Fig. 10
(a)
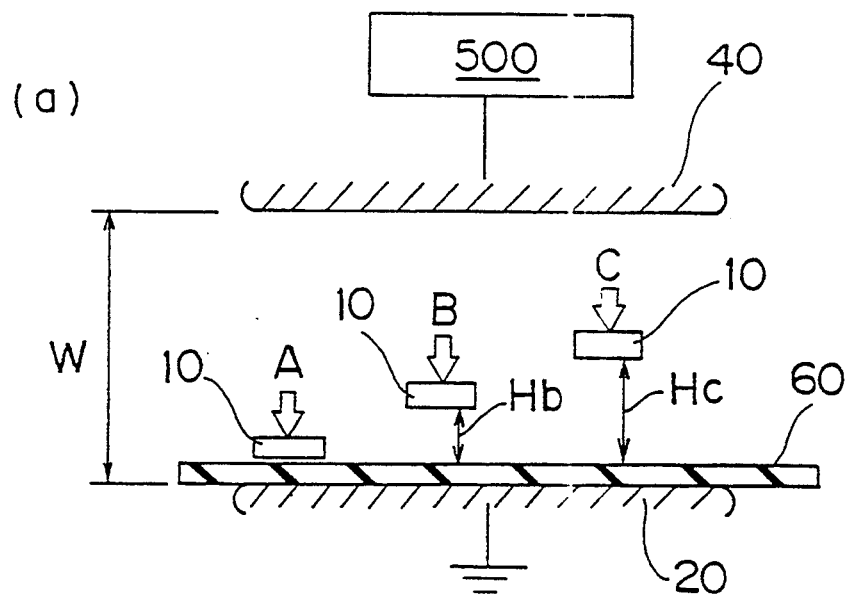
(b)
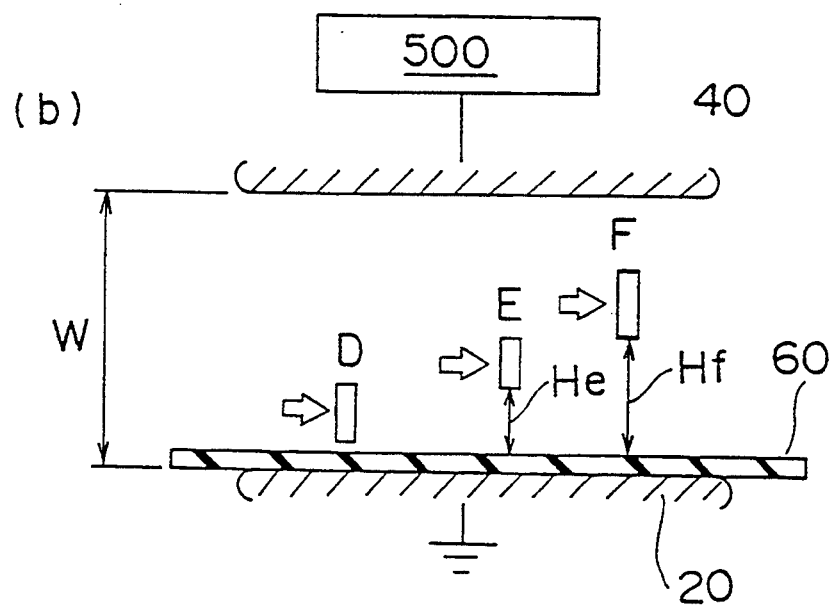

METHOD AND APPARATUS FOR CORONA DISCHARGE PROCESSING

BACKGROUND OF THE INVENTION

The present invention relates to a corona discharge processing method and apparatus, and more particularly to an method and apparatus to perform surface processing by corona discharge for resin formings having various three-dimensional shapes, in order to improve properties such as coating performance, printing, adhesion and so forth.

It has been widely known that, by performing the corona discharge processing on the surface of a resin film made from polypropylene and the like, performance such as printing and adhesion on the surface of films can be improved, and this processing has been used for manufacturing various kinds of articles. The corona discharge processing is performed under ordinary pressure not only on the surface of a resin film but also on the surface of resin formings having stereoscopic unevenness, that means a three-dimensional shape, in order to improve coating performance and adhesion.

In the conventional corona discharge processing, a pair of electrodes consisting of a discharge electrode and a counter-electrode are used, an article to be processed is placed between the electrodes, corona discharge is generated by applying a high voltage between the electrodes under ordinary pressure, and thereby the corona discharge processing is performed on a surface of the article to be processed. In this performing, as a high voltage charged between the electrodes, there has been usually used an alternating-current high frequency voltage. The alternating-current high frequency voltage easily generates corona discharge, so that it is said to be superior in the effects of surface processing effect. According to the Japanese Official Patent Provisional Publication No. showa 47-4890, it has been disclosed that the processing effects are improved by using a high voltage pulse having a pulse width of from about 100 to 200 μs in the corona discharge processing of films.

In the case where an article to be processed is a resin forming which has a three-dimensional shape, there have been proposed various kinds of improved methods, because it is required to perform superior corona discharge processing on a surface having unevenness and because various limitation exists compared with the case of flat films and boards.

For example, in the Japanese Official Patent Provisional Publication No. showa 57-119931, there has been disclosed a method comprising: arranging an article to be processed which is held on a counter-electrode, so that the tip of a discharge electrode always has a definite distance from the surface of the article to be processed; transferring a set of the counter-electrode and article to be processed while maintaining their relative arrangements to the discharge electrode unvariable; generating corona discharge by applying an alternating-current high frequency voltage between the counter-electrode and the discharge electrode; and accordingly, processing the surface of the article by the corona discharge processing. In the Japanese Official Patent Provisional Publication No. showa 62-57431, there has been disclosed a method comprising: relatively transferring a discharge electrode, the discharging tip of which has a curved face shape, along the surface of an article to be processed; and applying an alternating-current high frequency output of 20 to 30 kHz to perform the corona discharge processing.

However, in these kinds of corona discharge processing for resin formings having a three-dimensional shape, spark discharge easily occurs, so that there is such a problem as that sufficient processing of an edge part existing in an outer periphery of the resin formings or existing in an inner circumference of opening parts is very difficult.

This is because, in the conventional methods, when the discharge electrode approaches an edge part of the resin forming, corona discharge effective on the surface processing can not be maintained in a stable condition and spark discharge occurs by breakdown of an air layer. To avoid the spark discharge, an applied voltage may be lowered, but if doing so, the corona discharge processing does not sufficiently display the effects.

To solve these kinds of problems, in the Japanese Official Patent Provisional Publication No. showa 62-57431, there has been disclosed an art which comprises inserting a buffer board, made of a dielectric such as an epoxy resin and so forth, into an opening part of the resin forming in order to prevent a disorder of the corona discharge at the opening part. However, in this art, there needs to arrange a buffer board corresponding to a shape which an opening part of the resin forming has, and there is taken labor to fix the board at a specific position of the resin forming or counter-electrode, and therefore, there is a defect that working efficiency is very bad. Also, if there is a gap between an opening part and a buffer board, even if it is slight, breakdown occurs through this gap, which results in generation of spark discharge.

To solve the problems in prior arts as described above, the present inventors carried out intensive research on the waveform of a high voltage applied for the discharge electrode. As a result, they found that, if there is used a high voltage pulse having a very narrow pulse width, for example, such as having 10 to 100 kv in wave height, 1 μs or less in pulse width and 10 to 1000 pps in pulse frequency, spark discharge is hard to occur and excellent corona discharge is generated. Accordingly, they have disclosed this type corona discharge processing, which comprises the use of a high voltage pulse, in the Japanese Official Patent Provisional Publication No. heisei 4-328135.

However, in the case where a high voltage pulse having a very narrow pulse width as mentioned above is used, if the corona discharge processing is performed by applying a high voltage in order to enhance the effects, the energy efficiency becomes extremely bad and therefore, an interelectrode distance, that is a distance between the electrodes, can not be large. In the processing like this, an interelectrode distance with which corona discharge processing is practically possible is in a range of from 3 to less than 5 cm and, in the case where articles having a thickness thicker than the interelectrode distance and having various three-dimensional shapes are processed, there could not be obtained any satisfactory result.

If a high voltage pulse having a pulse width of 1 μs or less as in the aforementioned prior arts is used, the generation of spark discharge is effectively prevented, however, in a case of using a high voltage pulse having a narrow pulse width like the aforementioned, if the interelectrode distance becomes large, for example, 5 cm or more, it is hard to form a corona streamer (an accelerated electron stream) which is necessary for corona discharge processing, and also, even if the corona streamer is formed, the energy of effective corona discharge becomes small and the surface-processing effect on a surface of the resin forming is small.

Because of this, to afford the effects of corona discharge processing sufficiently on a surface of the resin forming, it is necessary to take the processing time in an extremely long extent. If the processing takes a long time, productivity lowers, so that it is unsuitable for industrial operation. Also, because the interelectrode distance is 5 cm or less, that is small, in a case where the resin molding has a complex three-dimensional shape, the structure of a discharge electrode becomes complex and it takes very high cost. If the discharge electrode is remade at every case where the shape of resin formings is altered even slightly, it can not be adopted in the use where the shape alteration of resin formings frequently occurs. Also, in a case where resin formings having different shapes are processed by one line of corona discharge processing, the electrode must be exchanged in every case where the resin formings are changed, and it requires very troublesome operation.

SUMMARY OF THE INVENTION

Accordingly, it is an object of the present invention to provide a corona discharge processing method and apparatus, which comprise solving the aforementioned problems involved in the prior arts, preventing generation of harmful spark discharge, and being capable of surely processing resin formings up to their edge parts as well as which comprises showing a high and uniform surface-processing effect upon resin formings, having an electrode of simple structure and that easily assembled, being capable of easily corresponding to the shape change of resin formings, and showing excellent productivity.

The corona discharge processing method, to solve the aforementioned problems and relating to the present invention, comprises arranging resin formings having three-dimensional shapes between a discharge electrode and a counter-electrode, generating corona discharge by applying a high voltage between both the electrodes, and thereby, performing corona discharge processing on surfaces of the resin formings; wherein the corona discharge is generated by a high voltage pulse having a pulse width of 1 $\mu$s or more, an average electric field strength of 4 to 20 kv/cm, preferably 6 to 20 kv/cm, denoted by an applied voltage (wave height) versus an interelectrode distance, and a pulse frequency of 10 pps or more. By this method, a high voltage suitable for a gap between the electrodes is applied and a uniform plasma region required for the processing of resin formings having three-dimensional shapes is formed.

A preferable material used for resin formings is such as made from an optional resin such as polypropylene, polyethylene and other polyolefin-based resins, which is able to improve properties of a surface by corona discharge processing. Since the polyolefin-based resins have not a polar group, adhesion and printing performance are bad, so that the corona discharge processing is effective to improve these performance. Needless to say, various kinds of additives such as a rubber material, pigment, filler, an anti-oxidant, a protector for ultraviolet rays and so forth are comprised, as occasion demands, in addition to the aforementioned resins.

The using resin formings have optional three-dimensional shapes such as a uneven shape, a rib type, or a hole type, which are decided in accordance with a purpose to use the resin formings. The present invention can display a superior processing effect upon resin formings in which opened holes are formed partly. Practical examples of the resin formings are an instrument panel pad (so-called inpanepad), bumper, garnish and the like, Among corona discharge apparatuses relating to the present invention, the first apparatus comprises arranging a discharge electrode and a counter-electrode face-to-face, having a high voltage-generating apparatus which generates corona discharge by applying a high voltage between the discharge electrode and the counter-electrode, and thereby, performing corona discharge processing on the surface of resin formings having three-dimensional shapes.

This first apparatus is characterized by having the following equipments:

a transfer conveyer to place the resin formings and to transfer them in order in a definite direction;

a counter-electrode which is arranged along a transfer route of the resin formings, in a down side of the transfer conveyer, and so as to be face-to-face with the lower end faces of the resin formings;

a dielectric to cover a surface of the counter-electrode; and a number of discharge electrodes which are arranged above the transfer route of the resin formings, so as to be face-to-face with the upper end faces of the resin formings, and along the transfer route.

In addition, this first apparatus is also characterized by that said high voltage-generating apparatus is a high voltage pulse-generating apparatus which applies a high voltage pulse having a pulse width of 1 $\mu$s or more, an average electric field strength of 6 to 20 kv/cm denoted by an applied voltage (wave-height value) versus an interelectrode distance, and a pulse frequency of 10 pps or more between the discharge electrodes and the counter-electrode.

For the transfer conveyer, a conventional conveyor mechanism which has been adopted for various kinds of transfer apparatuses can be used, as far as it is possible to place the resin formings like the aforementioned and to transfer them in order in a definite direction. Practical examples of the conveyer are a roller conveyer, a chain conveyer, a belt conveyer and the like. Practical shape and arrangement of the conveyer is determined in accordance with the shape and structure of resin formings. Since the conveyer is arranged between the resin formings and a counter-electrode, such a conveyer as having a relatively thin thickness is preferable. Also, arrangements should be made so as to prevent discharge between the conveyer and a discharge electrode by insulating the conveyer electrically, preferably, by constituting entire parts of the conveyer passing between the electrodes with insulated materials.

Structure of the discharge electrode and counter-electrode is fundamentally similar to that in a corona discharge processing apparatus used for common resin formings, and a conventional electrode structure can be freely adopted.

Practically, for example, as the counter-electrode, there is used an electrode of a board type or a face type which is made up of a curved face or a flat face being approximately parallel to the lower faces of resin formings. It is unnecessary that the counter-electrode and resin formings are in an adhered condition, and there may be a space between the counter-electrode and the resin formings or may interpose a dielectric between those. Therefore, even if the resin formings have complex unevenness, the shape of the counter-electrode may be made up of a relatively simple curved face or flat face. A preferable material used for the counter-electrode is a conductive material such as copper, aluminum, stainless steel and others which are used in common discharge apparatuses. Although thickness of the counter-electrode differs in correspondence with the shape and size of this electrode, a preferable thickness is usually about 1.0 mm or more. Also, it is possible to make a counter-electrode on the surface of a main body consisting of FRP and a synthetic resin by pasting thin foil and a film consisting of a conductive material. Furthermore, as a counter-electrode, even if it is not a continuous board or a face type, there are used the one of a net type or a cage type which is made by arranging fine linear materials lengthwise and breadthwise, and such as having many holes and slits on a board.

For the discharge electrode there is adopted the structure of a discharge electrode, which is known in public and commonly used for the corona discharge processing. There is practically used, for example, a structure which comprises arranging in a row electrodes of a thin plate type or a knife edge type having an end edge at a position, which is apart by a definite distance from the outer periphery of resin formings. There is also used a structure which comprises arranging electrode of a needle type in brush form. It is unnecessary to correspond the discharge electrode strictly with the outside shapes of the resin formings. Material of the discharge electrode is similar to that of the counter-electrode.

The distance between a discharge electrode and a counter-electrode, that is an interelectrode distance, is set so as to satisfy the undermentioned conditions. If the discharge electrode and counter-electrode are arranged each other in parallel, the interelectrode distance is the same at all positions, however, it is allowed to have somewhat different distances depending upon the positions. If either one or both of the discharge electrode and the counter-electrode is arranged so as to be freely transferable, the interelectrode distance can be altered, if necessary.

In the corona discharge processing, properties of generated corona discharge or processing effects upon resin formings vary by the waveform of a high voltage pulse applied between a discharge electrode and a counter-electrode.

In the present invention, there is used a high voltage pulse-generating apparatus from which the undermentioned high voltage pulse can be generated.

Among several elements of the high voltage pulse waveform, it is at first allowed to set the pulse width at 1 $\mu s$ or more, preferably in a range of from 2 to 20 $\mu s$. In a general processing condition, a pulse width in a range of from 3 to 10 $\mu s$ is preferred. If the pulse width is less than 1 $\mu s$, in a case where the interelectrode distance becomes large, the surface-processing effects upon resin formings are weak and the energy efficiency extremely lowers. If the pulse width becomes too large, harmful spark discharge (spark) is easy to generate, so that it is unfavorable.

Next, it is allowed to set the average electric field strength, which is denoted by an applied voltage (waveheight) versus an interelectrode distance, in a range of from 4 to 20 kv/cm, preferably from 6 to 20 kv/cm, more preferably from 6 to 10 kv/cm, most preferably from 7 to 10 kv/cm. If the average electric field strength is less than 4 kv/cm, effective corona discharge is hard to generate and the surface-processing effect becomes scarce. If the average electric field strength exceeds 20 kv/cm, harmful spark discharge (spark) is easy to generate. Therefore, both the cases are unfavorable.

The applied voltage is prescribed by the wave height of a voltage practically applied between a discharge electrode and a counter electrode, with which corona discharge processing is performed for resin formings. For practical measurement of the applied voltage, the wave height of a high voltage pulse waveform applied between a discharge electrode and a counter electrode is measured. A preferable range of the applied voltage varies with the interelectrode distance, for example, it is allowed to set the applied voltage in a range of from 120 to 300 kv, preferably from 160 to 240 kv, more preferably from 180 to 240 kv, most preferably from 200 to 240 kv. In a case where the applied voltage is relatively high and the average electric field strength is 6 kv/cm or more, it is desired to interpose the undermentioned dielectric between the counter-electrode and the resin formings.

The interelectrode distance is prescribed by a distance between a discharge electrode and a counter-electrode. A practical interelectrode distance may be determined by a maximum size of resin formings which are subjected to the corona discharge processing. In this invention, the interelectrode distance can be set to 5 cm or more and, in a practical use, for example, in a case where the resin forming is a bumper, a preferable interelectrode distance is in a range of from 25 to 35 cm.

Next, it is allowed to set the pulse frequency to 10 pps or more. In a common processing condition, the pulse frequency is set in a range of 50 to 100 pps. If the pulse frequency is less than 10 pps, effective energy of the corona discharge processing per an unit of time is small, time necessary for surface processing is very long, so that it is unfavorable. If the pulse frequency exceeds 200 pps, it becomes technically difficult to generate a high voltage pulse which has a high pulse frequency like this at the above-described pulse width and an average electric field strength. If it is intended to set the pulse frequency in a range of over 300 pps, a high voltage-generating apparatus becomes a large scale and the equipment cost becomes very high, so that it is industrially unprofitable.

For such a high voltage pulse-generating apparatus, there is used such as being fundamentally similar to a high voltage pulse-generating apparatus used in the conventional corona discharge processing. As far as the high voltage pulse-generating apparatus can generate such a high voltage pulse as the aforementioned from a commercial alternating-current power source or a direct-current power source, a practical circuit structure can be settled optionally. There can be used various kinds of circuit structure or apparatuses which have been so far used as an impulse high voltage-generating device.

To produce a pulse waveform as mentioned above by a high voltage pulse-generating apparatus, it is necessary to properly select, in a pulse-forming circuit, structure and properties of a high speed switch mechanism as well as circuit elements such as resistance, condenser and so forth, however, design of such a circuit can be performed by combining arts relating to high voltage pulse-generating apparatuses in common various fields.

If a dielectric is interposed between the counter-electrode and the resin formings, even in a case where in a range of the aforementioned conditions the applied voltage (wave height) is high and the average electric field strength is high, generation of harmful spark discharge (spark) can be surely prevented.

As the dielectric, there are used common dielectric materials such as vinyl chloride resin, Teflon resin and others. Thickness of the dielectric is 1 mm or more, preferably, it is in a range of from 5 to 20 mm. If the thickness is less than 1 mm, a preventive effect on spark discharge which is a target can not be sufficiently attained. Even if the thickness exceeds 20 mm, the preventive effect on spark discharge is not significantly different and such defects as a volume-increase of the dielectric and a cost-increase become large. Shape of the dielectric may be a curved face type or a flat face type so that it is almost along a surface shape of the counter-electrode. In a case where a relatively thin dielectric layer is formed on the surface of a counter-electrode, if a board of 1.0 mm or more, hopefully, 1.6 mm or more is used as the counter-electrode, sufficient mechanical strength and durability can be held. If thin foil or a film of a conductive material such as copper, aluminum and so forth is formed on a back face of the dielectric, this resultant conductive layer can be used as the counter-electrode. In this case, to hold mechanical strength, it is preferred to make thickness of the dielectric thick and the thickness is generally about 5 mm or more.

In a case of performing the corona discharge processing industrially, if the corona discharge is generated between the discharge electrode and the counter-electrode arranged above and below a transfer route of the resin formings while transferring the resin formings by a conveyer and the like, the corona discharge processing is effectively performed. The resin formings can be transferred in a condition of placing those on the counter-electrode which transfers together with the conveyer.

Next, among corona discharge processing apparatuses relating to the present invention, the second apparatus comprises arranging a discharge electrode and counter-electrode face-to-face, having a high voltage-generating apparatus which generates corona discharge by applying a high voltage between the discharge electrode and the counter-electrode, and thereby, performing corona discharge processing on the surface of resin formings having three-dimensional shapes.

This second apparatus is characterized by comprising:

installing props on a number of supporting stands running in a definite direction, setting on upper ends of the props a member to place the resin formings, arranging a counter-electrode along a transfer route of the resin formings, in a down side of the member to place the resin forming, and so as to be face-to-face with lower end faces of the resin formings, making on the counter-electrode a passing ditch through which the props pass along a running route of the supporting stands, covering a surface of the counter-electrode with a dielectric, and arranging a number of discharge electrodes above the transfer route of the resin formings, so as to be face-to face with upper end faces of the resin formings, and along the transfer route of the resin formings.

In addition, this second apparatus is also characterized by that said high voltage-generating apparatus is a high voltage pulse-generating apparatus which applies a high voltage pulse having a pulse width of 1 $\mu$s or more, an average electric field strength of 6 to 20 kv/cm denoted by an applied voltage versus an interelectrode distance, and a pulse frequency of 10 pps or more between the discharge electrode and the counter-electrode.

Structure of a fundamental apparatus is the same as that of the first apparatus and the same illustration about this is applied.

In the second apparatus, supporting stands are used as a transfer means of resin formings. The supporting stands are driven by a common conveyer mechanism and a number of supporting stands run a definite direction with standing on a straight line in row. On each supporting stand a prop is installed. The prop is exposed above the counter-electrode through a passing ditch which is made by penetrating the counter-electrode. A member to place resin formings is installed on the upper ends of the props. On this member, the resin formings are placed one by one or by a plural piece and transferred in a definite direction.

Structure of the member to place resin formings is determined so as to match the shape of resin formings to be placed on the member. To place the resin formings under a stable condition, a preferable structure of the member is a horizontally spread structure. As the member, there are used a board type one, a frame type one made by combining fine rods, a net type one and so forth.

As far as the prop can surely support the resin forming and member to place it, a prop as fine as possible is preferable. This is because width of the passing ditch formed at the counter-electrode is determined by thickness of the prop.

It is possible to install a plural of props or members to place resin formings on one supporting stand. It is preferred to constitute either one or both of the prop and member with an insulated material.

Since the prop on a supporting stand, that is a transfer means, passes through a position penetrating the counter-electrode, the counter-electrode has the same structure as that of the first apparatus except that the passing ditch is made on the counter-electrode along the passing route of the prop, and the surface of the counter-electrode is covered with a dielectric. As to the dielectric, it is preferred to cover up an inner edge of the passing ditch. If the passing ditch becomes wide, performance of the counter-electrode is affected, so that a narrow passing, ditch is preferred. Practically, it is preferred to set width of the passing ditch so as to be about one-third or less based on the interelectrode distance.

Structure of the discharge electrode and high voltage pulse-generating apparatus may be similar to that of the aforementioned first apparatus.

For the third apparatus, the above second apparatus is modified so that the prop installed on the supporting stand has the prop-installed part as a fulcrum and fluctuates in a direction which is along the passing ditch. To fluctuate the prop, there is used a common fluctuating mechanism such as a cam mechanism, a guide roller mechanism, a cylinder mechanism, a gear mechanism and the like which have been also used in various kinds of mechanical apparatuses. The resin formings placed on the member vary for the discharge electrode their inclination and posture in a definite range with fluctuation of the prop and, thereby, corona discharge processing is performed.

In a case where the surface-processing of resin formings is performed by corona discharge by a high voltage pulse, it has been known that the property of corona discharge varies with the waveform of a high voltage pulse and that the difference in the surface-processing effects on resin formings occurs.

Hitherto, in order to perform the corona discharge processing without causing spark discharge, it has been considered that the pulse width must be 1 μs or less. Then, to give a sufficient corona discharge processing effect on the surface of resin formings, it has been considered that the electrode and the surface of resin formings should be placed in adjacent positions.

On the other hand, even if the pulse width is set at 1 μs or more as in the present invention, if the average electric field strength is in a range of 4 to 20 kv/cm and the pulse frequency is 10 pps or more, spark discharge (spark) harmful for the surface processing of resin formings is hard to generate and excellent corona discharge processing can be performed. Also, even if generation of the spark discharge somewhat occurs, for example by interposing a dielectric of simple structure between the counter-electrode and the resin formings, the corona discharge processing effect is not damaged and the spark discharge is prevented.

On the other hand, as the pulse width becomes broader, the effective discharge energy increases and the surface-processing effect on resin formings is strengthened, or the corona discharge gets longer on the surface of resin formings. That is, even if the interelectrode distance is extended, corona discharge of sufficient strength can be generated and an excellent surface-processing effect is attained, so that it is unnecessary to arrange each electrode very closely to the surfaces of resin formings. Therefore, using a counter-electrode and discharge electrode of simpler shapes, the discharge electrode can be arranged at a position apart from the resin formings. As a result, even in a case of resin formings having complex shapes, a relatively simple shape can be adopted as a shape of the electrodes, and it is unnecessary to change the shape of electrodes with each of resin formings.

Next, the average electric field strength and the effects of pulse frequency are explained.

The discharge phenomenon is affected by the electric field strength applied to the space. That is, even in a case where applied voltage is the same, an extent of the voltage per an unit distance, that is electric field strength, is different between a case of long interelectrode distance and a case of short interelectrode distance, and the generating condition of corona discharge or spark discharge becomes different. Also, even if the extent of effective discharge energy given by one cycle of the pulse is the same, when the pulse frequency increases or decreases, the total amount of discharge energy given within a definite time increases or decreases and, as a result, the surface-processing effect on resin formings varies. Accordingly, upon setting the pulse width at such a value as the aforementioned, the average electric field strength and pulse frequency are respectively set in a range of 4 to 20 kv/cm and at 10 pps or more, an excellent corona discharge processing effect is attained as well as it is easy to suppress the generation of spark discharge.

Next, in a range of the aforementioned conditions, if the average electric field strength is set in a range of 6 to 20 kv/cm, the corona discharge processing effect is enhanced. However, in this case, the spark discharge is easy to generate compared with a case where the average electric field strength is small. Therefore, in a case like this, if a dielectric of 1 mm or more in thickness is interposed between the counter-electrode and the resin formings, the dielectric surely suppresses the generation of spark discharge.

As mentioned above, according to the corona discharge processing method relating to the present invention, even if it is not allowed that the resin formings to be processed and the electrodes are one another in close positions, an excellent corona discharge processing effect can be displayed as well as harmful spark discharge is not generated, by using a waveform having an especially defined pulse width, average electric field strength and pulse frequency as a high voltage pulse waveform in order to generate corona discharge.

As a result, it becomes unnecessary to make the discharge electrode or the counter-electrode in strict accordance with the shape of resin formings. Also, even if the shape of resin formings is altered, there is no need to remake the electrodes. Furthermore, continuous processing for resin formings having different shapes becomes possible by using only one corona discharge processing line and without exchanging the electrode at each time and, when the present invention is applied for the scene of labor producing various kinds of articles and requiring a large scale of processing for resin formings having different shapes, great contribution is made to elevate the working efficiency of corona discharge processing and to reduce the labor cost.

Furthermore, in the first apparatus, since a counter-electrode covered with a dielectric is arranged on a lower side of the transfer conveyer to transfer resin formings and a discharge electrode is arranged above the resin formings, the transfer of resin formings is easy and the conveyer structure can be simplified. Even if a transfer conveyer exists between the counter-electrode and the resin formings and there is a space between the counter-electrode and the resin formings, sufficiently good corona discharge processing is performed if such a high voltage pulse waveform as mentioned above is used.

Also, in the second apparatus, since only the member to place the resin formings in the transfer means exists between the resin formings and a counter-electrode and since the supporting stands and a means to drive it, which are a main body of the transfer means, may be set below the counter-electrode, a transfer means having sufficient mechanical strength and transfer capability can be used and an application for resin formings of heavy weight is possible.

In the third apparatus, if the props fluctuate, the resin formings fluctuate, and corona discharge processing of the resin formings is performed in varying the angle and posture for the discharge electrode in a definite range. In a case where corona discharge processing is performed under conditions of the same posture of the discharge electrode and resin formings, sometimes the corona discharge is not sufficiently attained with variation in the shapes of resin formings, so that there is formed a position where the effects of corona discharge processing become locally weak. Therefore, as the aforementioned, if the resin formings fluctuate and vary their posture, uniform corona discharge processing can be performed up to every nook and corner.

According to the aforementioned corona discharge processing apparatus relating to the present invention, the resin formings can be processed by corona discharge using a high voltage pulse while the resin formings being transferred, and the promotion of efficiency of corona discharge processing as well as the elevation of processing performance can be intended.

In particular, if the aforementioned especially defined high voltage pulse waveform is used, if a discharge electrode and counter-electrode are fixed, and if the counter-electrode is covered with a dielectric, stable corona discharge is formed without causing harmful spark discharge and excellent corona discharge processing can be performed on the surface of resin formings.

Further, because excellent corona discharge processing is possible even if there is a distance between the resin forming and the discharge electrode or between the resin forming and the counter-electrode, the corona discharge processing can be performed by adopting constitution of such an apparatus as described above, while transferring the resin formings successively by a transfer conveyer. Furthermore, it is possible to process the resin formings having different shapes continuously by only one corona discharge processing line and without exchanging electrodes at every time and, when the corona discharge processing of present invention is applied at the scene of labor where various kinds of articles are produced and a large amount of processing is needed, it greatly contributes to elevation of the working efficiency and reduction of the labor cost.

BRIEF DESCRIPTION OF DRAWINGS

FIG. 10 shows an entire schematic view denoting electrode arrangements in a case where a test to confirm performance was performed.

DESCRIPTION OF THE PREFERRED EMBODIMENTS

Referring now to the figures, some of the examples of method of present invention are described in detail below.

Figure 1:
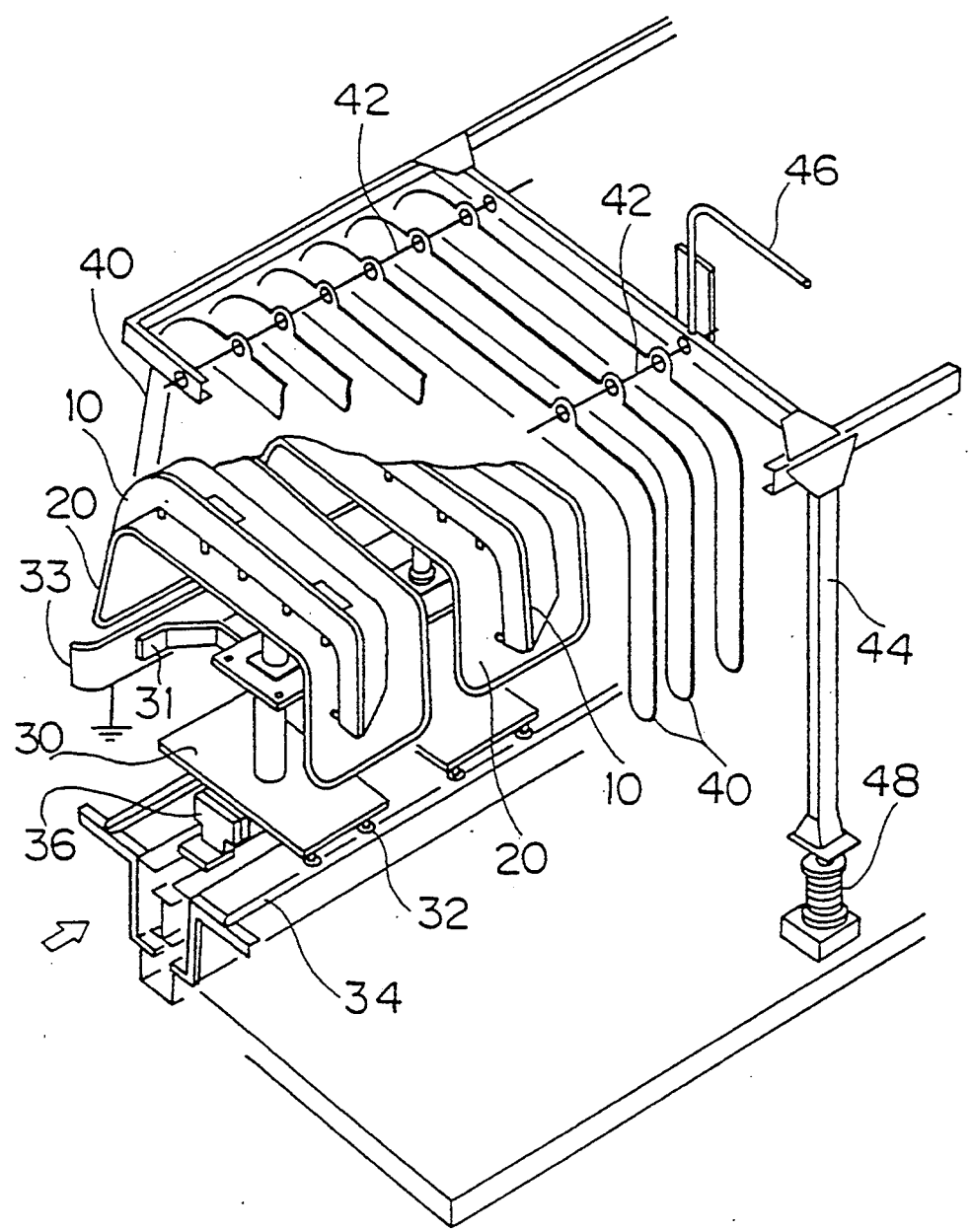
FIG. 1 shows the entire perspective diagram of a corona discharge processing apparatus showing an example of this invention.

FIG. 1 shows an outside appearance structure of apparatus for performing a corona discharge processing method relating to the present invention.

As the resin forming 10, there is used a bumper for automobiles being made of a polypropylene resin and having an approximately C-alphabetic character type shape, and the corona discharge processing is performed as pretreatment to carry out coating on a surface of the resin forming 10. The resin formings 10 are placed on the counter-electrode 20, of which cross-sectional view along the down side faces of the resin forming 10 makes a crooked board of a C-alphabetic character shape. Although there exists complex unevenness on the rear faces of resin formings 10, the surface of counter-electrode 20 is allowed to be flat and also, it allowed to have a space between the counter-electrode 20 and the resin formings 10. The counter-electrode 20 is set at the supporting stand 30 which runs by the wheels 32 set at four corners of a down face of the stand 30 on the rail 34 disposed on a floor face. Also, the driving conveyer 36 is connected to the middle of the down face of supporting stand 30 and, by running this driving conveyer 36 in a straight-line manner by a motor or a chain-driving mechanism and the like, the supporting stand 30 and resin formings 10 can be run in the arrow-marked direction. Also, the collector 31 set at the supporting stand 30 and extended sideward is in contact with the bus bar 33 which is arranged along a running route of the supporting stand 30 and grounded. Since the supporting stand 30 runs with fluctuating the collector 31 by the bus bar 33, the counter-electrode 20 and supporting stand 30 are always grounded.

Above a running route of the resin formings 10, the discharge electrodes 40 of a thin belt board type curved in a C-alphabetic character are arranged in a row at a definite interval. A preferable board thickness of the discharge electrode 40 is about 0.1 to 0.2 mm and a board width is about 10 to 50 mm. A shape at the lower end edge of discharge electrode 40 approximately corresponds to that at the upper end edge of resin forming 10, the lower end edge of discharge electrode 40 is arranged in almost parallel with the surface of counter-electrode 20 having an interspace of about several 10 cm. The upper part of discharge electrode 40 is supported by the rod type connecting metal fittings 42 as well as connected so as to make an electric unit. The discharge electrode 40 is set with the connecting metal fittings 42 by a bolt and the like so as to be free to set and to take off, and it is arranged so that the setting pitch of discharge electrode 40 can be altered as occasion demands. The connecting metal fittings 42 are set with the frame 44 made of an insulated material such as vinyl chloride or the like at both terminals of the metal fittings 42. Also, with the connecting metal fittings 42, there is connected the high voltage cable 46 which is connected with a high voltage pulse-generating apparatus being not drawn. The frame 44 made of an insulated material is disposed on a floor face via the insulator 48.

Accordingly, the resin formings 10 placed on the counter-electrode 20 are transferred through a down side of the discharge electrode 40 as well as a high voltage pulse is applied between the discharge electrode 40 and the counter-electrode 20 to generate corona discharge and thus, the corona discharge processing can be performed on the surface of resin formings 10.

Figure 2:
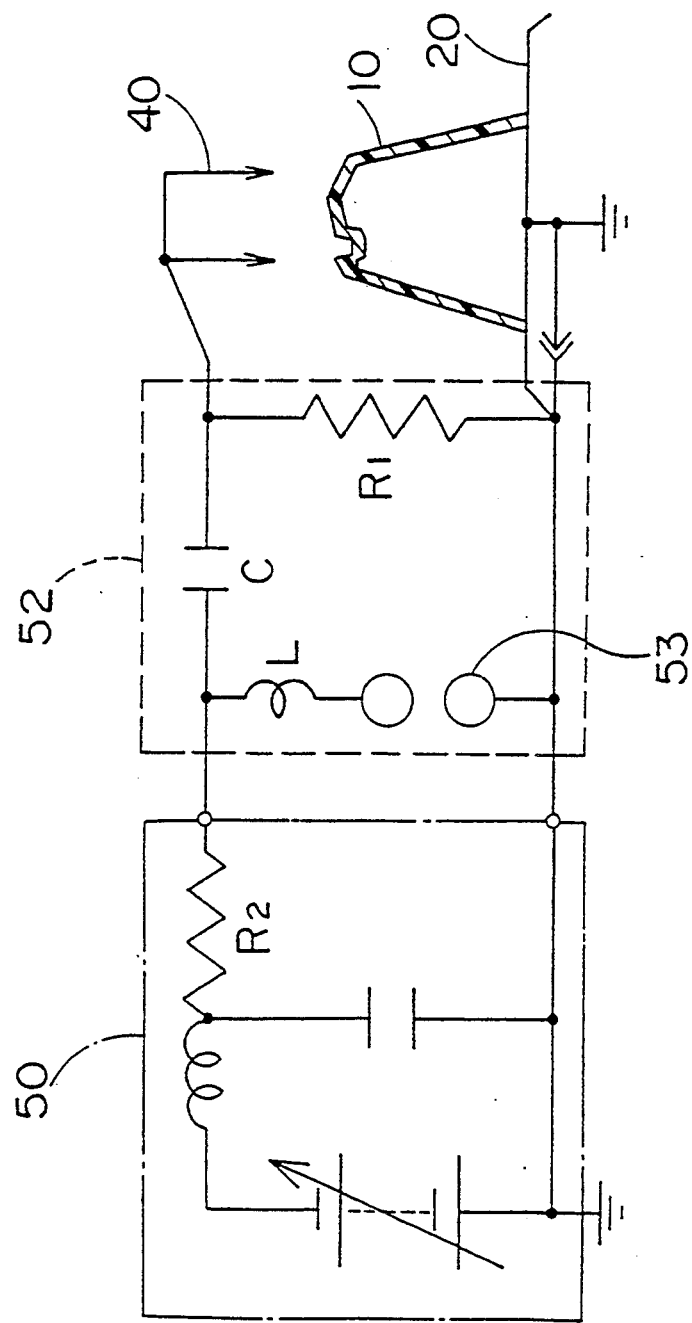
FIG. 2 shows a circuit diagram showing the circuit constitution of a high voltage pulse-generating apparatus.

FIG. 2 shows a practical example of the circuit structure of a corona discharge processing apparatus. The resin formings 10 are placed on the counter-electrode 20 via the dielectric 60 and, above the resin formings 10, the discharge electrode 40 is arranged. On the circuit connecting to the discharge electrode 40 and counter-electrode 20, the waveform casting circuit 52 and the high voltage power source of a negative electrode type 50 are arranged. The high voltage power source of a negative electrode type 50 is such that a desired high voltage electric current can be made similar to the case of common various high voltage apparatuses. In the waveform casting circuit 52, the fixed gap switch 53, inductance L, condenser C for charging and discharging, load resistance $R_1$ are arranged to generate the pulse. The fixed gap switch 53 is a so-called sphere gap switch. By properly setting conditions such as a circuit constant of the waveform casting circuit 52, a high voltage pulse having desired properties can be applied between the discharge electrode 40 and counter-electrode 20.

Figure 3:
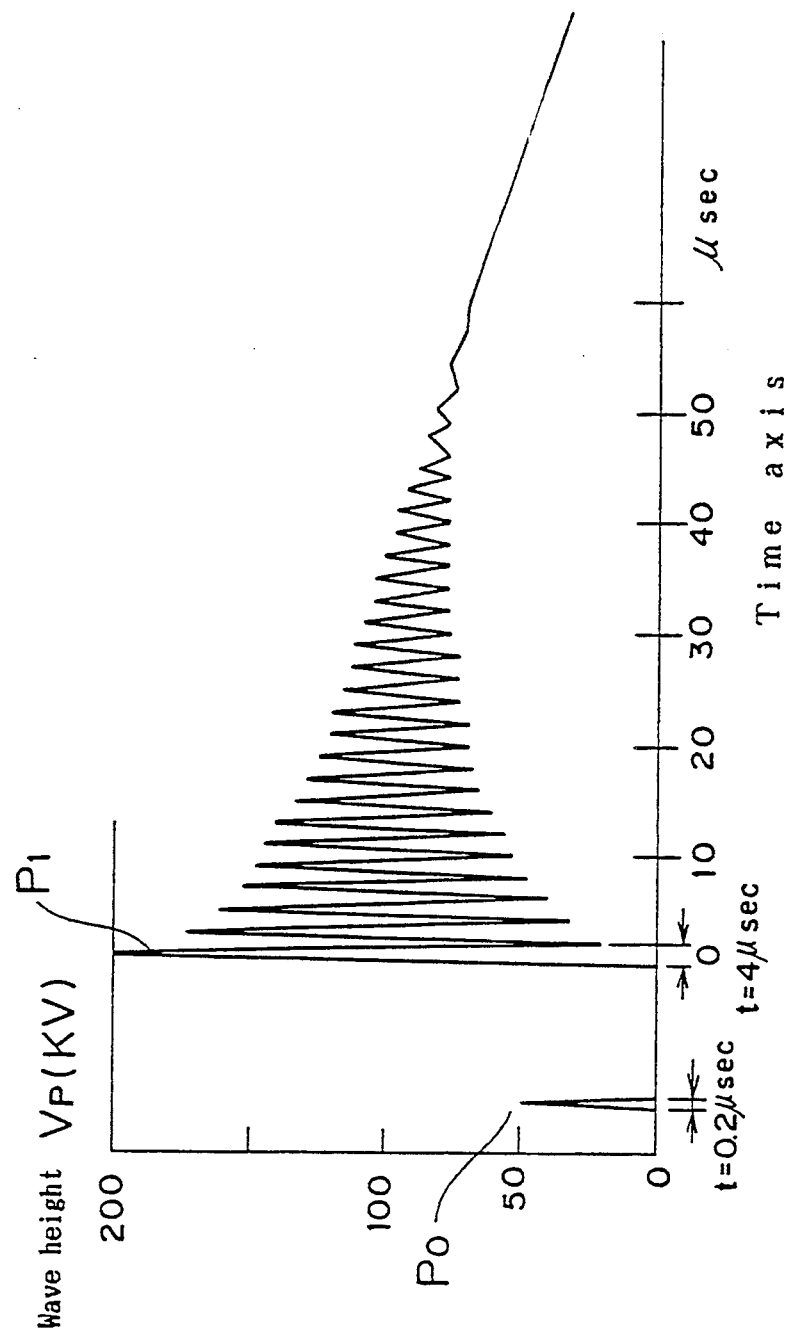
FIG. 3 shows a diagram to denote a waveform of one example of high voltage pulses.

FIG. 3 shows the waveform of a high voltage pulse. This waveform is the one obtained by measuring by an oscillograph the waveform of a voltage being applied between the discharge electrode 40 and counter-electrode 20.

The waveform $P_0$ is a waveform of a conventional high voltage pulse having a pulse width of 1 $\mu$s or less, of which pulse width t is about 0.2 $\mu$s and wave height Vp is about 50 kv.

Figure 4:
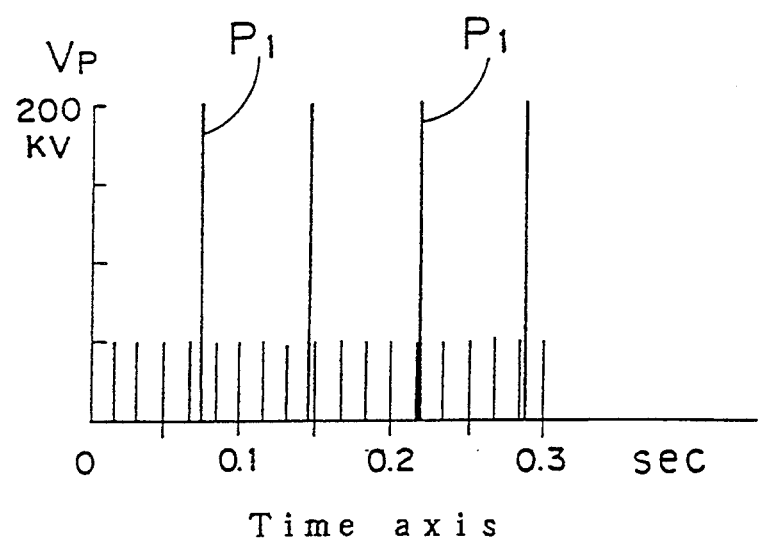
FIG. 4 shows a diagram to denote the generating conditions of a high voltage pulse with passage of time.

On the other hand, the waveform $P_1$ is a waveform showing one example of a high voltage pulse used in the present invention. This waveform shows a so-called damped oscillation waveform. In a damped oscillation waveform of this type, the pulse width t is prescribed by a pulse width of the first wave and, practically, t=4 $\mu$s. The wave height Vp is prescribed by the first waveform and it shows 200 kv. Accordingly, in this example, there is used the waveform $P_1$ having a far broad pulse width t and a high wave height Vp compared with those of the conventional wave form $P_0$. Then, as shown in FIG. 4, this type waveform $P_1$ is repeatedly generated at every time of a definite interval. In this example, one pulse is generated at every time interval of about 4/60 seconds and the pulse frequency is 15 pps.

In the high voltage pulse-generating apparatus of FIG. 2, the damping time of a high voltage pulse can be regulated by the load resistance $R_1$ in the circuit and, as the load resistance $R_1$ becomes larger, the damping time becomes longer. By a value of the inductance L, the pulse width t is set. Although the condenser C for charging and discharging differs with an overall length of the discharge electrode, it is usually settled so as to have a value of about ten times as large as electrostatic capacity in a processing discharge region.

Furthermore, it is preferable to use a suitable value of the protective resistance $R_2$ in accordance with volume of the condenser C for charging and discharging. The pulse frequency is determined by a value of the protective resistance $R_2$ and other conditions and, as a result, the processing time necessary for performing defined corona discharge processing on the resin formings 10 varies. In practice, for example, if the protective resistance $R_2$ is enlarged when the condenser volume C being constant, the pulse frequency becomes small and, if the protective resistance $R_2$ becomes small, the pulse frequency becomes large. Under common processing conditions, if the pulse frequency is a value in a range of from 20 to 100 pps, time necessary for processing is about 1 to 6 minutes. For the fixed gap switch 53, a sphere type one is commonly used, but a snow potbelly type one having a small projection at the tip can display excellent performance. If compressed air of which temperature and humidity are adjusted and controlled is supplied into a surrounding space of the fixed gap switch 53, more excellent and stable performance can be displayed. In the pulse casting circuit 52 shown in FIG. 2, a resonance phenomenon occurs and a discharge voltage higher than an inputting voltage is obtained, so that it is preferable in view of both safety and economy.

Various kinds of pretreatment can be carried out similarly to the case of conventional processing before performing the corona discharge processing on the resin forming 10. For example, to keep clean a surface of the resin forming 10, it is preferable to carry out washing by a solvent and by an acid or alkali and then, to carry out rinsing by water and drying followed by processing by corona discharge. However, concerning the aforementioned washing processes, if the resin forming 10 is taken care so as not to be contaminated by oil, dust and others when being formed by injection molding and the like or in a storage period of after molding, it can be subjected to corona discharge processing without passing through the washing processes.

A practical example of the washing processes is to carry out the following processes in order: at first, alkali-washing by shower-spraying at a temperature of 50° to 60° C. for 0.5 to 1 minute; warm water-rinsing by shower-spraying at a temperature of 40° to 50° C. for 0.5 minutes; neutralizing adjustment at a temperature of 40° to 50° C. for 0.5 minutes; again, warm water-rinsing at a temperature of 40° to 50 ° C. for 0.5 minutes; drying at a temperature of 90° to 100° C. for 4 to 5 minutes; and then, the aforementioned corona discharge processing is performed. The corona discharge processing is performed, for example, at a temperature of 20° to 30° C. for about 3 to 6 minutes. After the corona discharge processing, the resin forming is transferred into a common coating process.

Next, FIGS. 5 to 8 show examples denoting different electrode structure.

Figure 5:
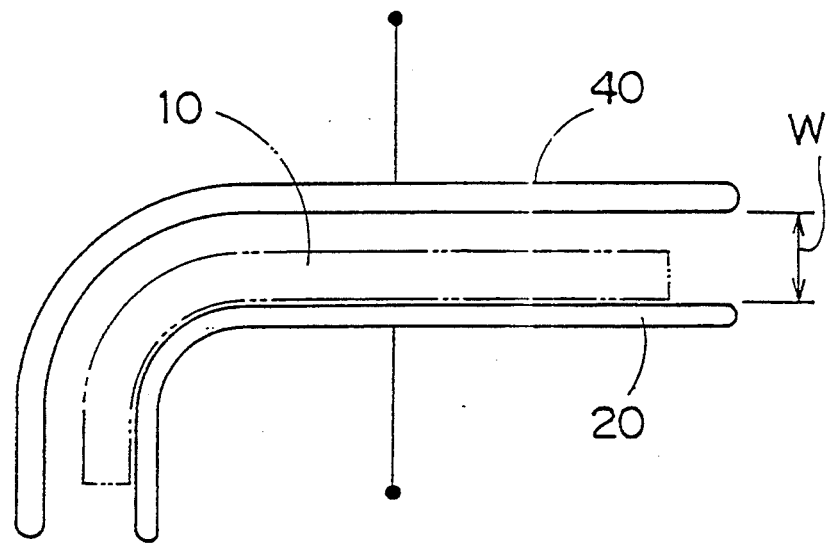
FIG. 5 shows a front view denoting a practical example of electrode arrangements.

As shown in FIG. 5, for the resin forming 10 having an approximately L-alphabetic character shape, there is used counter-electrode 20 having the same L-alphabetic character shape along lower face of the resin forming 10, and the discharge electrode 40 forms the same L-alphabetic character shape. In this case, because the counter-electrode 20 and discharge electrode 40 are in parallel, the interelectrode distance W is the same at any position. As shown in the example of this FIG. 5 and in the example of next FIG. 6, in a case where there is a crooked part or a curved part on the discharge electrode 40 and counter-electrode 20, it is preferable to set the radius of curvature of this part at 50 mm or more. This is because, if the radius of curvature is too small, generating conditions of the corona discharge become different between a small part in the radius of curvature and other parts and there is a case where the corona discharge processing on the surface of resin forming 10 becomes ununiform.

Figure 6:
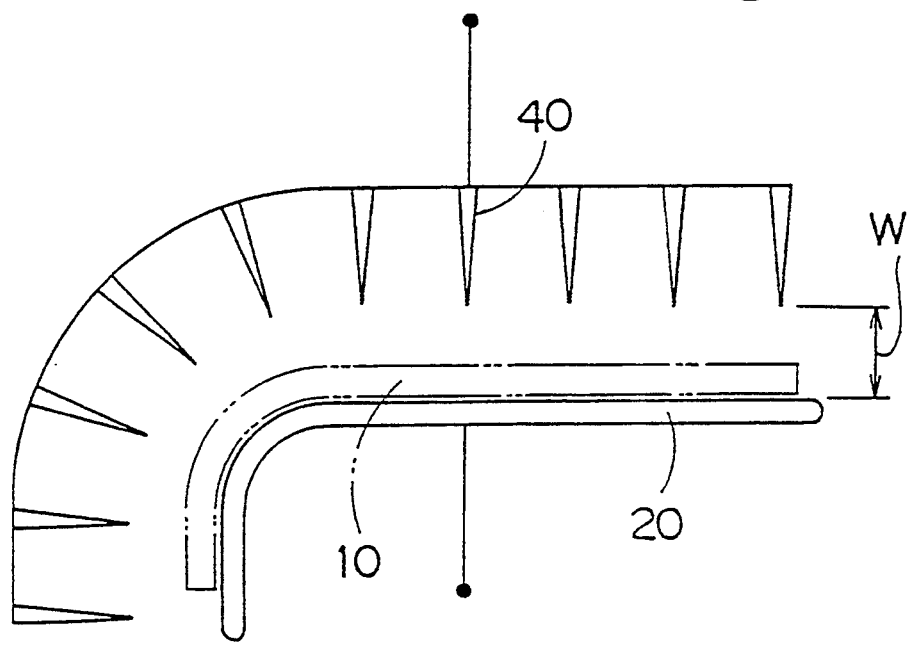
FIG. 6 shows a front view denoting another practical example of electrode arrangements.

In FIG. 6, as the discharge electrode 40, there is used the one in which a number of electrodes of a needle type are arranged in a row. Since the corona discharge is easy to generate from the tip of an electrode of a needle type, an excellent corona discharge processing effect can be attained.

Figure 7:
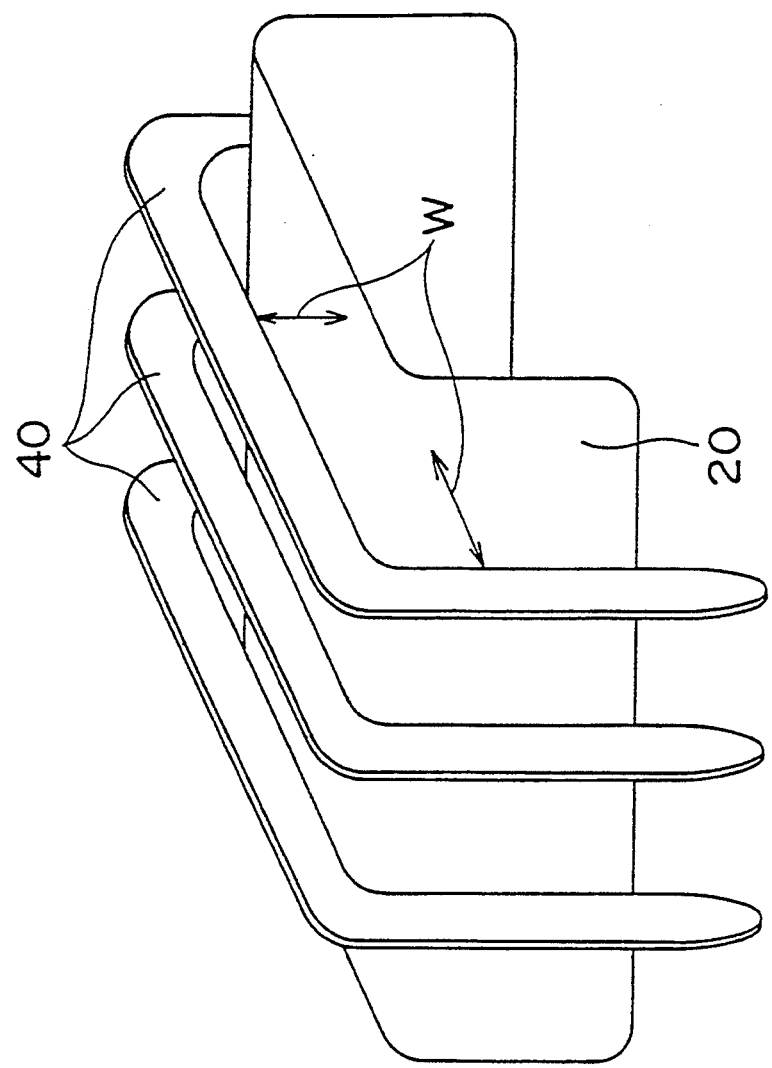
FIG. 7 shows a perspective diagram denoting another practical example of electrode arrangements.

The example of FIG. 7 is nearly similar to the example of FIG. 1, wherein the counter-electrode 20 of a board type crooked to a C-alphabetic character shape and a number of discharge electrodes 40 of a thin C-alphabetic character-shaped belt type are arranged in a row at a definite interval.

Figure 8:
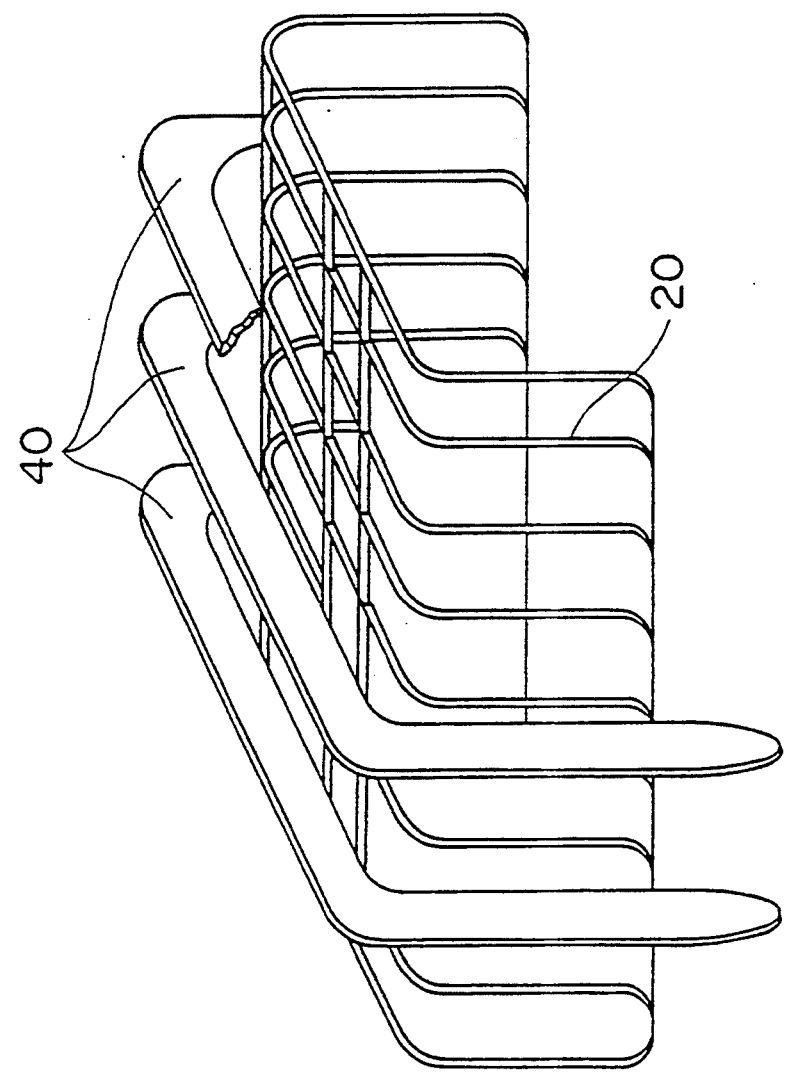
FIG. 8 shows a perspective diagram denoting another practical example of electrode arrangements.

In the example of FIG. 8, the counter-electrode 20 is made by combining thin needle materials into a basket type and an approximate shape of the whole is similar to the example of FIG. 7. As in this example, even if the counter-electrode 20 has a space in part, if an opening and density of the space is properly set, it is possible to generate excellent corona discharge between the counter-electrode 20 and the discharge electrode 40.

If the discharge electrode 40 or the counter-electrode 20 are let to have a divided structure, fine regulation of the interelectrode distance can be carried out by changing arrangement of the divided electrode in accordance with the shapes of resin formings 10.

Figure 9:
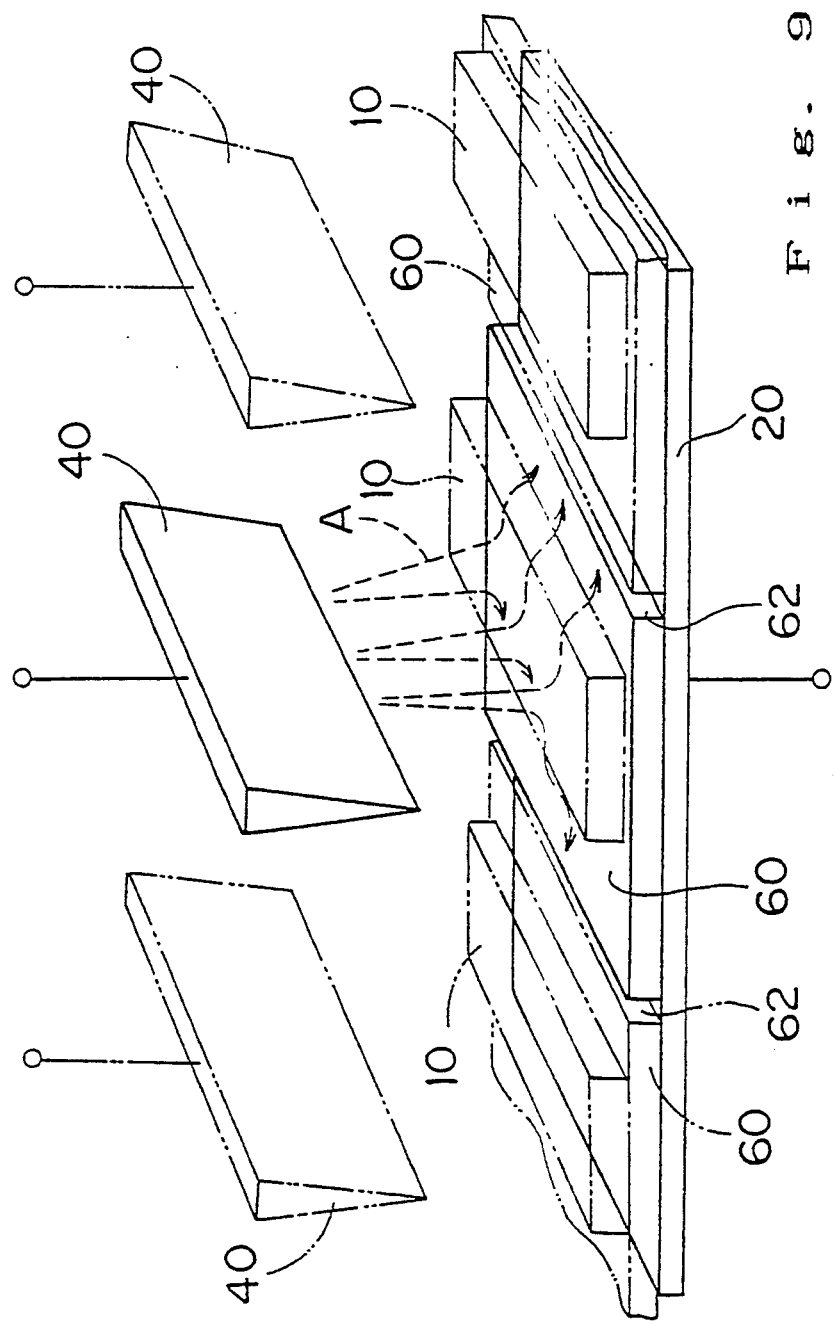
FIG. 9 shows a perspective diagram denoting a practical example of electrode arrangements in a case where a dielectric is used.

Next, FIG. 9 shows a case where the dielectric 60 is interposed between the counter-electrode 20 and the resin formings 10. As in this Fig., if a break 62 is made at an intermediate position of adjacent discharge electrodes 40 and 40 and on the dielectric 60 arranged on the counter-electrode 20, the discharge of each electrode 40 becomes strong and spark discharge does not occur. As a result, the corona discharge processing can be performed better than a case where the surface of counter-electrode 20 is completely covered with the dielectric 60.

Referring now to the figures, some of the examples of apparatus of present invention are described in detail below.

Figure 11:
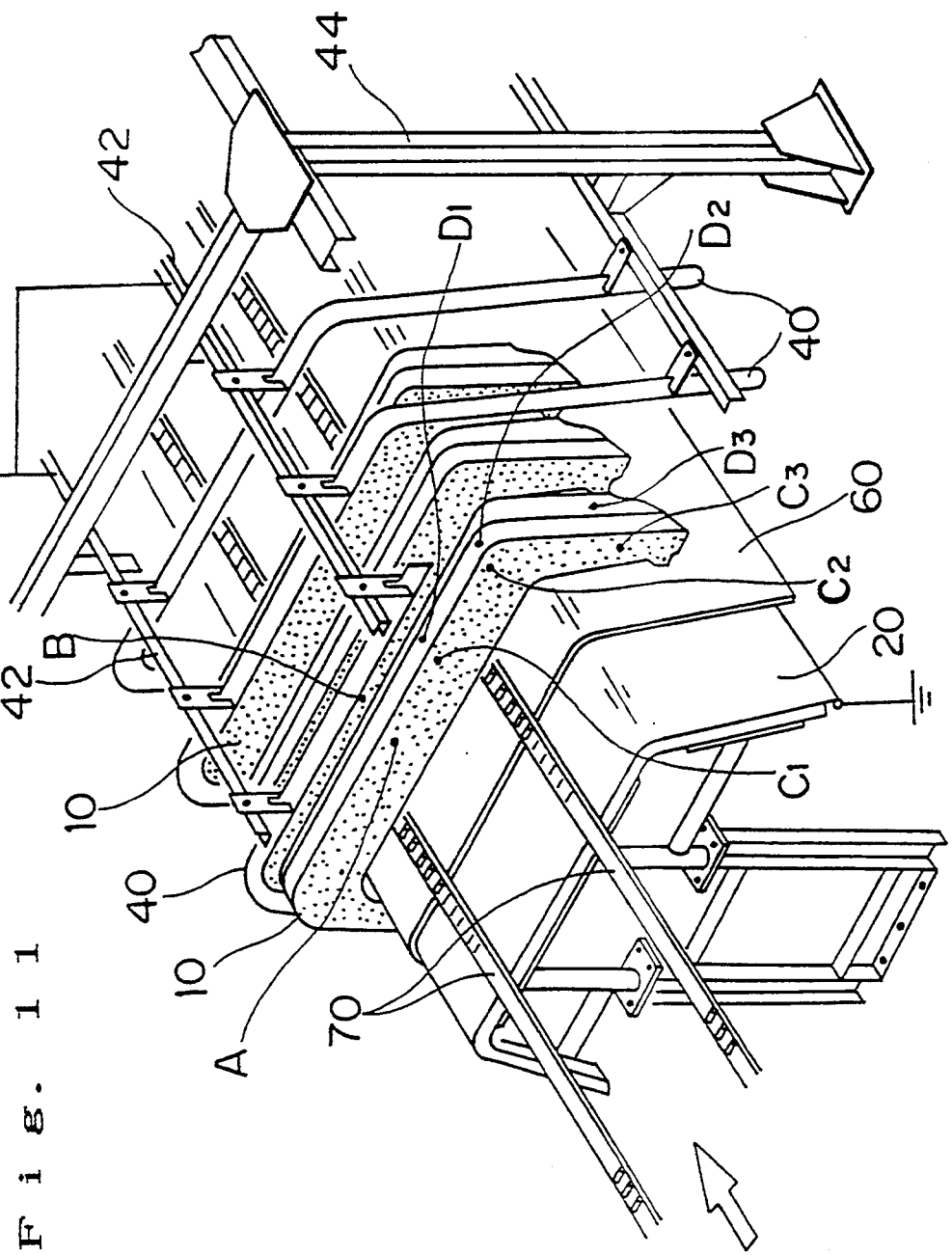
FIG. 11 shows the entire perspective diagram of a corona discharge processing apparatus showing an example of this invention.

FIG. 11 shows an outside appearance structure of a corona discharge processing apparatus relating to the present invention.

As the resin forming 10, there is used a bumper for automobiles being made of a polypropylene resin and having an approximately C-alphabetic character type shape, and the corona discharge processing is performed as pretreatment to carry out coating on a surface of the resin forming 10. A number of resin formings 10 are transferred in a row on the roller conveyer 70 disposed in a rail type of two lines. The roller conveyer 70 is disposed above the counter-electrode 20 and made of an insulator type resin. The counter-electrode 20 is made of a board material of which sectional view makes a C-alphabetic character shape along the lower end face of the resin formings 10, and an upper face of the counter-electrode 20 is covered with the dielectric 60.

Above a running route of the resin formings 10, the discharge electrodes 40 of a thin belt board type curved in a C-alphabetic character are arranged in a row at a definite interval. A preferable board thickness of the discharge electrode 40 is about 0.1 to 0.2 mm and is a board width about 10 to 50 mm. A shape at the lower end edge of discharge electrode 40 approximately corresponds to that at the upper end edge of resin forming 10, the lower end edge of discharge electrode 40 is arranged in almost parallel with the surface of counter-electrode 20 having an interspace of about several 10 cm. Furthermore, the radius of curvature at the lower end edge of discharge electrode 40 or at the upper face of discharge electrode 20 is set at 50 mm or more, preferably 100 mm or more. This is because, if the radius of curvature is small, the generating condition of corona discharge is variable between a part having a small radius of curvature and other parts, so that it is hard to perform uniform corona discharge processing. The upper part of discharge electrode 40 is supported by the thin belt type connecting metal fittings 42 as well as connected so as to make an electric unit. The discharge electrode 40 is set with the connecting metal fittings 42 by a bolt and the like so as to be free to set and take off, and it is arranged so that the setting pitch of discharge electrode 40 can be altered as occasion demands. The connecting metal fittings 42 is set with the frame 44 at both terminals of the metal fittings 42. With the connecting metal fittings 42, the high voltage pulse-generating apparatus 500 is connected through a high voltage cable.

In the above example, the dielectric 60 completely covered the counter-electrode 20 without a gap, but it can leave a gap at a middle position of the adjacent discharge electrode 40. Like this, if there is arranged a partial gap on the dielectric 60, corona discharge from the discharge electrode 40 toward the counter-electrode 20 is generated well and the effects of corona discharge processing upon the resin forming 10 is enhanced. However, it is necessary to arrange a gap of the dielectric 60 at a position and shape where spark discharge is hard to generate. That is, a position near the discharge electrode is unfavorable and too big an area of the gap is also unfavorable. Even if the size a gap is as narrow as an extent with which only a linear type cutting is formed on the dielectric 60, sufficient effects are obtained.

Figure 12:
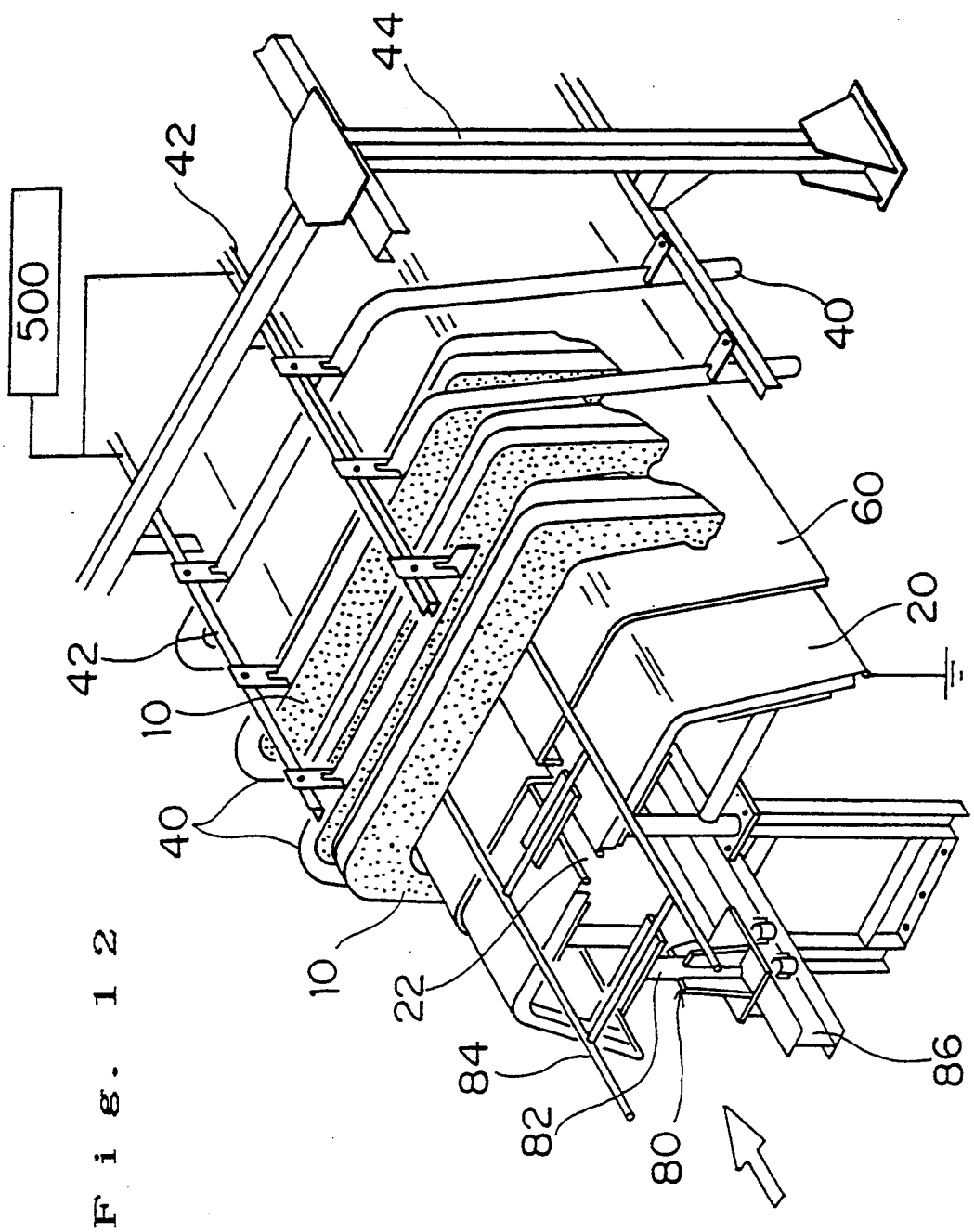
FIG. 12 shows a perspective diagram of an entire apparatus denoting another example.

Next, another example is shown in FIG. 12.

In this example, a number of supporting stands 80 running on the rail 86 is arranged below the counter-electrode 20. Vertical props 82 are installed so as to stand on the supporting stands 80. At a center of the counter-electrode 20, the passing ditch 22 is made along a passing route of the props 82 so as to penetrate the counter-electrode 20. At the upper ends of props 82, there is set the member 84 to place resin formings, which is made by combining thin rods to form a H-alphabetic character approximately. The member 84 is set along a surface of the dielectric 60 which is on the upper face of counter-electrode 20, in order to support the lower face of resin formings 10. Therefore, the resin formings 10 placed on the member 84 are transferred in order in a definite direction accompanied with running of the supporting stands 80. The member 84, prop 82 and supporting stand 80 are insulated from the floor face or counter-electrode 20.

Figure 13:
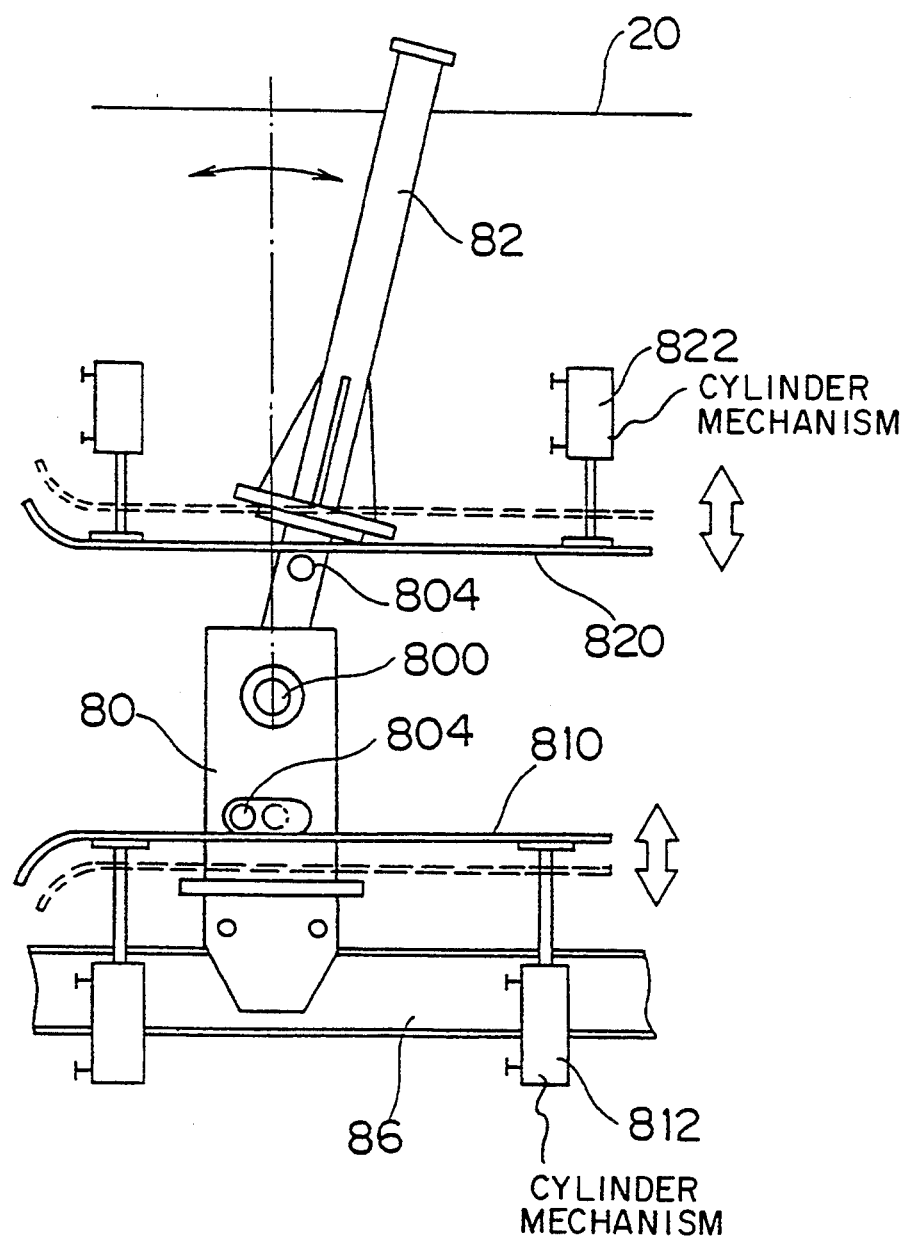
FIG. 13 shows a side structural view denoting a fluctuating mechanism of the prop.
Figure 14:
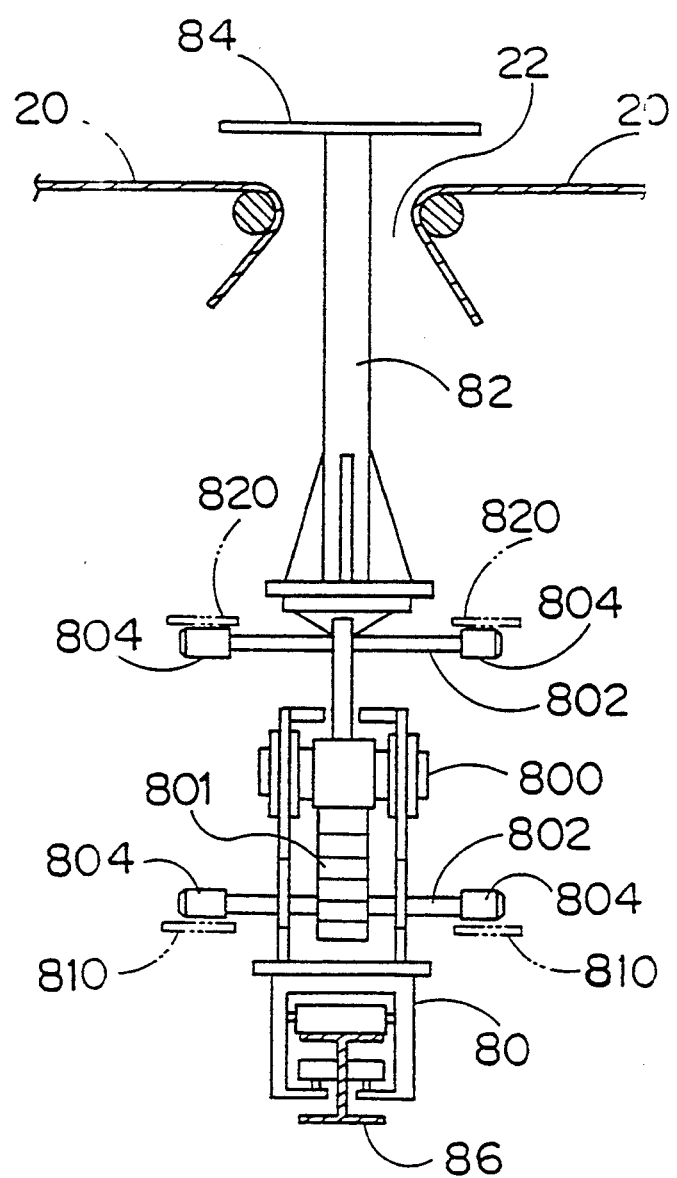
FIG. 14 shows a cross-sectional view in a direction crossing vertically with FIG. 6.

FIGS. 13 and 14 show an example which comprises adding a fluctuating mechanism to the prop 82 of the supporting stand 80 in the example shown in the above-described FIG. 11.

The prop 82 is installed on the supporting stand 80 at the fulcrum 800 which freely rotates, along a direction of the passing ditch 22, and so as to be able to rotate. In addition, below the fulcrum 800, a dead weight, that is the balancer 801, is set at a lower end of the prop 82. Gravity added to this balancer 801 always acts strength to return the balancer 801 to the lowest condition, that is a condition of the vertically standing prop 82. The guide arm 802 projected to the left and right at the two up-and-down positions are set in the middle of the prop 82. The fluctuating roller 804 is set at the tip of guide arm 802.

The fluctuating roller 804 set at a lower side of the prop 82 is arranged so that the guide rail 810 for fluctuating comes in contact with a down face of the fluctuating roller 804. The guide rail 810 for fluctuating is set along the entire running route of the supporting stand 80. At a down face of the guide rail 810 for fluctuating, a cylinder mechanism 812 which acts in a vertical direction is set and, by expanding and contracting the cylinder mechanism 812, the guide rail 810 for fluctuating goes up and down.

The fluctuating roller 804 set on an upper side of the prop 82 is also brought in contact with a similar guide rail 820 for fluctuating. At an upper face of the guide rail 820 for fluctuating, the cylinder mechanism 822 is set.

Accordingly, the fluctuating rollers 804 which are set at an upper part and a lower part of the prop 82 are in condition of lying between both of the outside guide rails 810 and 820. Under the condition, if the upper and lower guide rails 810 and 820 go up and down, the fluctuating rollers 804 are pushed up and down by the guide rails 810 and 820.

If the fluctuating rollers 804 are let to push down or push up, the prop 82 which is set by the fulcrum 800 so as to freely rotate turns out to be inclined front or back from a vertical condition. The inclined prop 82 automatically returns to a vertical condition by action of the balancer 801. That is, the prop 82 fluctuates front and back by that a periodic up-down movement of the guide rails 810 and 820 for fluctuating is repeated. A fluctuating angle of the prop 82 is regulated by an up-down extent of the guide rails 810 and 820. Usually, the fluctuating range is set at about 15° in each of the front and back.

In an apparatus equipped with a fluctuating mechanism of the prop 82 like the aforementioned, the resin formings 10 placed on the member 84 fluctuate front and back and, by varying periodically the inclination and posture toward the discharge electrode 40, a defined corona discharge processing is performed. Therefore, even if unevenness or a shadow part on which corona discharge processing is difficult to perform exists in a part of the resin formings 10, the unevenness or shadow part is excellently processed by varying the posture of resin formings 10. As a result, uniform and excellent corona discharge processing can be performed for the whole body of resin formings 10.

Figure 15:
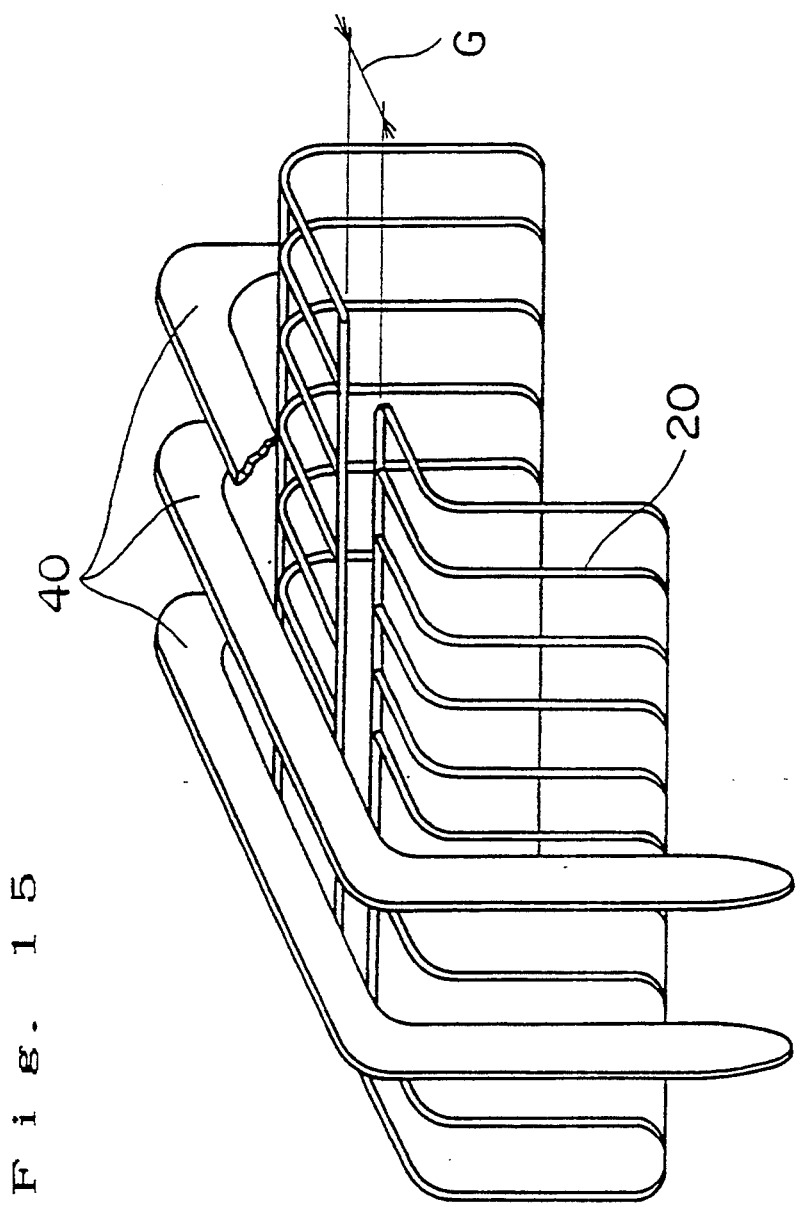
FIG. 15 shows a perspective diagram showing an example, in which the electrode arrangement is different.

FIG. 15 shows an example in which the electrode structure is different.

Although the discharge electrode 40 is similar to that in each of the aforementioned examples, the counter-electrode 20 is made by combining thin linear materials into a basket type and the entire outline shape is similar to that of the aforementioned example. Also, in this example, the counter-electrode 20 is divided to the left and right and, at a middle of the upper face, the gap G which becomes the passing ditch 22 is opened. Even if the counter-electrode 20 has a space in part as shown in this example, if a space and density of the gap is properly set, it is possible to generate excellent corona discharge between the counter-electrode 20 and discharge electrode 40. Practically, in a case where the interelectrode distance is 30 cm, even if the gap G at a middle of the counter-electrode 20 is about 100 mm, there is no problem in the performance of corona discharge processing.

Next, more practical examples of the corona discharge processing method of this invention are explained.

EXAMPLE 1

As the resin forming 10 there was used a PP test piece, M4800 (150 mm × 60 mm × 3 mm) made by Mitsui Sekiyu Kagaku Co., Ltd.

The counter-electrode 20, discharge electrode 40 and resin formings 10 are arranged as shown in the A of FIG. 10(a), the corona discharge processing was performed by generating a high voltage pulse by the high voltage pulse-generating circuit 500 equipped with a circuit structure similar to that shown in FIG. 2. Furthermore, in a part of examples, on the counter-electrode 20, a vinyl chloride sheet of 10 mm in thickness was arranged as a dielectric 60 so as to cover the whole face of the counter-electrode 20, and on this sheet, the resin formings 10 were placed. The interelectrode distance W between the discharge electrode 40 and the counter-electrode 20 was set in a range of 15 to 30 cm and a high voltage pulse was applied. With changing the waveform of the high voltage pulse variously, the corona discharge processing was performed on the resin formings 10. Various properties of the waveform of the high voltage pulse was measured by an oscillograph. The processing time was set in a range of 1 to 5 minutes. For comparison, using the same apparatus, the results obtained from the processing by a high voltage pulse in a conventional corona discharge processing method are shown as the comparative examples 1.8 to 1.11. However, in these comparative examples, it was difficult to set the applied voltage at a value of 50 kv or more and there was not obtained any datum which might be obtained when the applied voltage is set at a value of 50 kv or more.

The resin formings 10 processed by the corona discharge processing were coated. As a coating there was used R-271 (a two-solution curing type urethane coating) made by NBC Co., Ltd., which was coated and dried by a common method. The drying was carried out at 90° C. for 30 minutes. After standing for 24 hours, the peeling strength of coating was measured by performing a 180° C. peeling test in order to confirm the effects of corona discharge processing. Test results are shown in Tables 1 to 4.

TABLE 1

| | | interelectrode distance: 30 cm, pulse width: 4 $\mu s$ | | | | | |
|---|---|---|---|---|---|---|---|
| | | wave height value | average electric field strength | pulse frequency | peeling strength g/cm processing time | | |
| | dielectric | kv | kv/cm | pps | 1 min. | 3 min. | 5 min. |
| example 1.1 | present | 230 | 7.7 | 10 | 500 | 700 | 1000 |
| example 1.2 | present | 230 | 7.7 | 20 | 1000 | 1200 | 1500 |
| example 1.3 | present | 230 | 7.7 | 60 | 1500 | 1800 | 2000 |

TABLE 1-continued

| | | \multicolumn{5}{c}{interelectrode distance: 30 cm, pulse width: 4 μs} | | |
|---|---|---|---|---|---|---|---|
| | | wave height value | average electric field strength | pulse frequency | peeling strength g/cm processing time | | |
| | dielectric | kv | kv/cm | pps | 1 min. | 3 min. | 5 min. |
| example 1.4 | present | 230 | 7.7 | 100 | 1500 | 2000 | 2000 |
| example 1.5 | present | 180 | 6.0 | 20 | 300 | 500 | 800 |
| example 1.6 | present | 180 | 6.0 | 100 | 1000 | 1200 | 1200 |
| example 1.7 | absent | 180 | 6.0 | 20 | 500 | 800 | 1200 |
| example 1.8 | absent | 180 | 6.0 | 100 | 1200 | 1500 | 1800 |
| example 1.9 | present | 120 | 4.0 | 20 | 100 | 150 | 250 |
| example 1.10 | present | 120 | 4.0 | 100 | 300 | 450 | 600 |
| example 1.11 | absent | 120 | 4.0 | 20 | 200 | 350 | 500 |
| example 1.12 | absent | 120 | 4.0 | 100 | 600 | 800 | 1000 |
| comparative example 1.1 | absent | 230 | 7.7 | 10 | \multicolumn{3}{c}{Spark was generated.} | |
| comparative example 1.2 | present | 100 | 3.3 | 20 to 100 | 0 | 0 | 0 |
| comparative example 1.3 | absent | 100 | 3.3 | 100 | 0 | 0 | 50 |

TABLE 2

| | | \multicolumn{5}{c}{interelectrode distance: 15 cm, pulse width: 4 μs} | | |
|---|---|---|---|---|---|---|---|
| | | wave height value | average electric field strength | pulse frequency | peeling strength g/cm processing time | | |
| | dielectric | kv | kv/cm | pps | 1 min. | 3 min. | 5 min. |
| example 1.13 | present | 180 | 12.0 | 20 | 1800 | 2000 | 2000 |
| example 1.14 | present | 180 | 12.0 | 100 | 1900 | 2000 | 2000 |
| example 1.15 | present | 120 | 8.0 | 20 | 1200 | 1500 | 1800 |
| example 1.16 | present | 120 | 8.0 | 100 | 1800 | 2000 | 2000 |
| example 1.17 | present | 120 | 8.0 | 100 | 1800 | 2000 | 2000 |
| example 1.18 | absent | 60 | 4.0 | 20 | 150 | 300 | 450 |
| example 1.19 | absent | 60 | 4.0 | 100 | 550 | 700 | 900 |
| comparative example 1.4 | absent | 180 | 12.0 | 20 | \multicolumn{3}{c}{Spark was generated.} | |
| comparative example 1.5 | absent | 120 | 8.0 | 20 | \multicolumn{3}{c}{Spark was generated.} | |
| comparative example 1.6 | present | 60 | 4.0 | 20 | 0 | 0 | 0 |
| comparative example 1.7 | present | 60 | 4.0 | 100 | 0 | 0 | 60 |

※ In example 1.14, spark was slightly recognized, but processing effects were not affected.

TABLE 3

| | | \multicolumn{5}{c}{interelectrode distance: 6 cm, pulse width: 0.2 μs} | | |
|---|---|---|---|---|---|---|---|
| | | wave height value | average electric field strength | pulse frequency | peeling strength g/cm processing time | | |
| | dielectric | kv | kv/cm | pps | 1 min. | 3 min. | 5 min. |
| comparative example 1.8 | absent | 50 | 8.0 | 20 | 0 | 50 | 100 |
| comparative example 1.9 | absent | 50 | 8.0 | 100 | 100 | 300 | 500 |

TABLE 4

| | | \multicolumn{5}{c}{interelectrode distance: 3 cm, pulse with: 0.2 μs} | | |
|---|---|---|---|---|---|---|---|
| | | wave height value | average electric field strength | pulse frequency | peeling strength g/cm processing time | | |
| | dielectric | kv | kv/cm | pps | 1 min. | 3 min. | 5 min. |
| comparative example 1.10 | absent | 30 | 8.0 | 20 | 1000 | 1200 | 1500 |
| comparative example 1.11 | absent | 30 | 10.0 | 100 | 1500 | 1800 | 2000 |

Results from the aforementioned tests are shown in Tables 3 and 4. In a conventional method in which a high voltage pulse having a very narrow pulse width (comparative examples 1.8 to 1.11) is used, an excellent corona discharge processing effect is obtained when the interelectrode distance is small (3 cm), however, when the interelectrode distance becomes larger even in a small extent (6 cm), the processing effect extremely lowers. Furthermore, in a high voltage pulse-generating circuit of FIG. 2 used for the tests (however, in a case of no inductance L), it was difficult to set the pulse width at 0.2 μs and the wave height at 50 kv or more, and in a case of setting the wave height in a range of 50 to 60 kv or more, a sufficient processing effect was not obtained.

On the other hand, in the examples of this invention, even if the interelectrode distance is 30 cm, it was proved that a practically sufficient corona discharge effect is obtainable.

Also, from the results in Table 1, it is seen that, when the average electric field strength is less than 4 kv/cm (comparative examples 1.2 and 1.3), the corona discharge processing effect is absent. From the results in Tables 1 and 2, it is seen that, when the average electric field strength is 7 kv/cm or more, spark is generated in the absence of a dielectric (comparative examples 1.1, 1.4 and 1.5), however, excellent corona discharge processing can be performed by using a dielectric (examples 1.1 to 1.4 and 1.13 to 1.17). Also, in a case of the dielectric being arranged, when the average electric field strength is less than 6 kv/cm, the processing effect is insufficient, however, it is seen that, when it is 6 kv/cm or more, the processing effect is enhanced by raising the pulse frequency. Furthermore, when the average electric field strength is 4 kv/cm, in the absence of a dielectric, an excellent processing effect is obtained (examples 1.18 and 1.19), but in the presence of a dielectric, there is a case where the corona discharge processing can not be performed (comparative examples 1.6 and 1.7). Accordingly, when the present invention is performed, in a relatively low range of the average electric field strength (from 4 to 6 kv/cm), there is a case where absence of the dielectric is a better result.

EXAMPLE 2

As seen in A to F of FIGS. 10(a) and 10(b), the corona discharge processing was performed in a space between the discharge electrode 40 and the counter-electrode 20, by changing the position and posture of resin formings 10 and under the same processing conditions as used for the example 1.2. The processing time was set as 3 minutes. Evaluation of the peeling test was carried out about the upper face (in the case of horizontal posture) and the vertical side face (in the case of vertical posture), which were indicated by arrow marks in the figures, among several faces which the resin formings 10 have. Furthermore, Hb, Hc, He and Hf in the figures denote the height of resin formings 10 from the surface of dielectric 60. Test results are shown in Table 5.

TABLE 5

| | | posture | height H cm | peeling strength g/cm |
|---|---|---|---|---|
| example 2.1 | FIG. 10 (a) A | horizontal | 0 | 1100 |
| example 2.2 | FIG. 10 (a) B | horizontal | 10 | 1140 |
| example 2.3 | FIG. 10 (a) C | horizontal | 20 | 1260 |
| example 2.4 | FIG. 10 (b) D | vertical | 0 | 1100 |
| example 2.5 | FIG. 10 (b) E | vertical | 10 | 1250 |
| example 2.6 | FIG. 10 (b) F | vertical | 20 | 1060 |

As seen from the test results, even if the position and posture of resin formings 10 between the electrodes are altered, the corona discharge processing effect does not show any significant difference and, in every case, practically sufficient processing effects are attained. Also, it was confirmed that, even if the resin formings 10 are not in an adhered condition with the counter-electrode 20, excellent corona discharge processing can be performed.

Next, a more practical example is explained, in which the corona discharge processing is performed by using a corona discharge processing apparatus of this invention.

EXAMPLE 3

Using an apparatus having a structure shown in FIG. 11 and the conveyer 70 made of only a dielectric, corona discharge processing was performed for a polypropylene-made bumper as the resin forming 10.

Processing conditions are as follows.

Interelectrode distance: 30 cm, pulse width: 4 μs, pulse frequency: 100 pps, processing time: 5 minutes, and dielectric thickness: 1.0 mm (a vinyl chloride sheet).

The bumper 10 processed by corona discharge was coated. As a coating, there was used R-271 made by NBC Co., Ltd. (a two-solution curing type urethane coating), which was coated according to a conventional method and dried. The drying was carried out at 90° C. for 30 minutes. After standing for 24 hours, a 180° peeling test was carried out to measure peeling strength of the coating, whereby the effects of corona discharge processing was confirmed. Positions determined for the measurements were the point A in FIG. 11 (in a condition of placing a bumper on a conveyer, a backward position just above the middle), the point B (in the same condition as for the point A, a forward position just above the middle), $C_1$ to $C_3$ (positions apart outside in order from the point A), $D_1$ to $D_3$ (positions apart outside in order from the point A). Measured results are shown in Table 6.

TABLE 6

| | wave height value kv | average electric field strength kv/cm | peeling strength g/cm measured position | | | |
|---|---|---|---|---|---|---|
| | | | A | B | $C_1$ to $C_3$ | $D_1$ to $D_3$ |
| example 3.1 | 120 | 4.0 | 0 | 0 | 0 | 0 |
| example 3.2 | 180 | 6.0 | 1200 | 1100 | 1300 to 1400 | 1200 to 1300 |
| example 3.3 | 240 | 8.0 | 1900 | 1900 | 1900 to 2000 | 1900 to 2000 |

EXAMPLE 4

The procedure of example 3 was repeated except that thickness of the dielectric was 5 mm. Measured results are shown in Table 7.

TABLE 7

| | wave height value kv | average electric field strength kv/cm | peeling strength g/cm measured position | | | |
|---|---|---|---|---|---|---|
| | | | A | B | $C_1$ to $C_3$ | $D_1$ to $D_3$ |
| example 4.1 | 120 | 4.0 | 0 | 0 | 0 | 0 |
| example 4.2 | 180 | 6.0 | 1100 | 1000 | 1200 to 1350 | 1100 to 1350 |
| example 4.3 | 240 | 8.0 | 1900 | 1800 | 1850 to 2000 | 1800 to 2000 |

EXAMPLE 5

The procedure of example 3 was repeated except that thickness of the dielectric was 10 and 20 mm. The obtained results were similar to those from the example 4.

COMPARATIVE EXAMPLE 2

The procedure of example 3 was repeated except that the dielectric was not used. Measured results are shown in Table 8.

TABLE 8

| | wave height value kv | average electric field strength kv/cm | peeling strength g/cm measured position | | | |
|---|---|---|---|---|---|---|
| | | | A | B | $C_1$ to $C_3$ | $D_1$ to $D_3$ |
| comparative example 2.1 | 120 | 4.0 | 0 | 0 | 0 | 0 |
| comparative example 2.2 | 180 | 6.0 | 1200 | 1000 | 1900 to 2000 | 1700 to 2000 |
| comparative example 2.3 | 240 | 8.0 | Spark was generated. | | | |

As seen in the results from the examples 3 to 5 and comparative example 2, when thickness of the dielectric is 1 mm or more, even if the transfer apparatus set above the counter-electrode is made of a dielectric, uniform corona discharge processing is obtained.

EXAMPLE 6

Using an apparatus having a structure shown in FIG. 12, the procedure of examples 3 to 5 was repeated. As a result, at positions of the passing ditch 22 made on the counter-electrode 20, that are the positions A and B where the measurements were carried out, some decrease of the peeling strength was observed compared with strength at other parts, however, it was confirmed that the decrease is such as not to be a practical problem. In this apparatus, since the resin formings are transferred by placing those on the supporting stands 80, even in a case of resin formings having considerable weight, efficient corona discharge processing can be performed.

COMPARATIVE EXAMPLE 3

Figure 16:
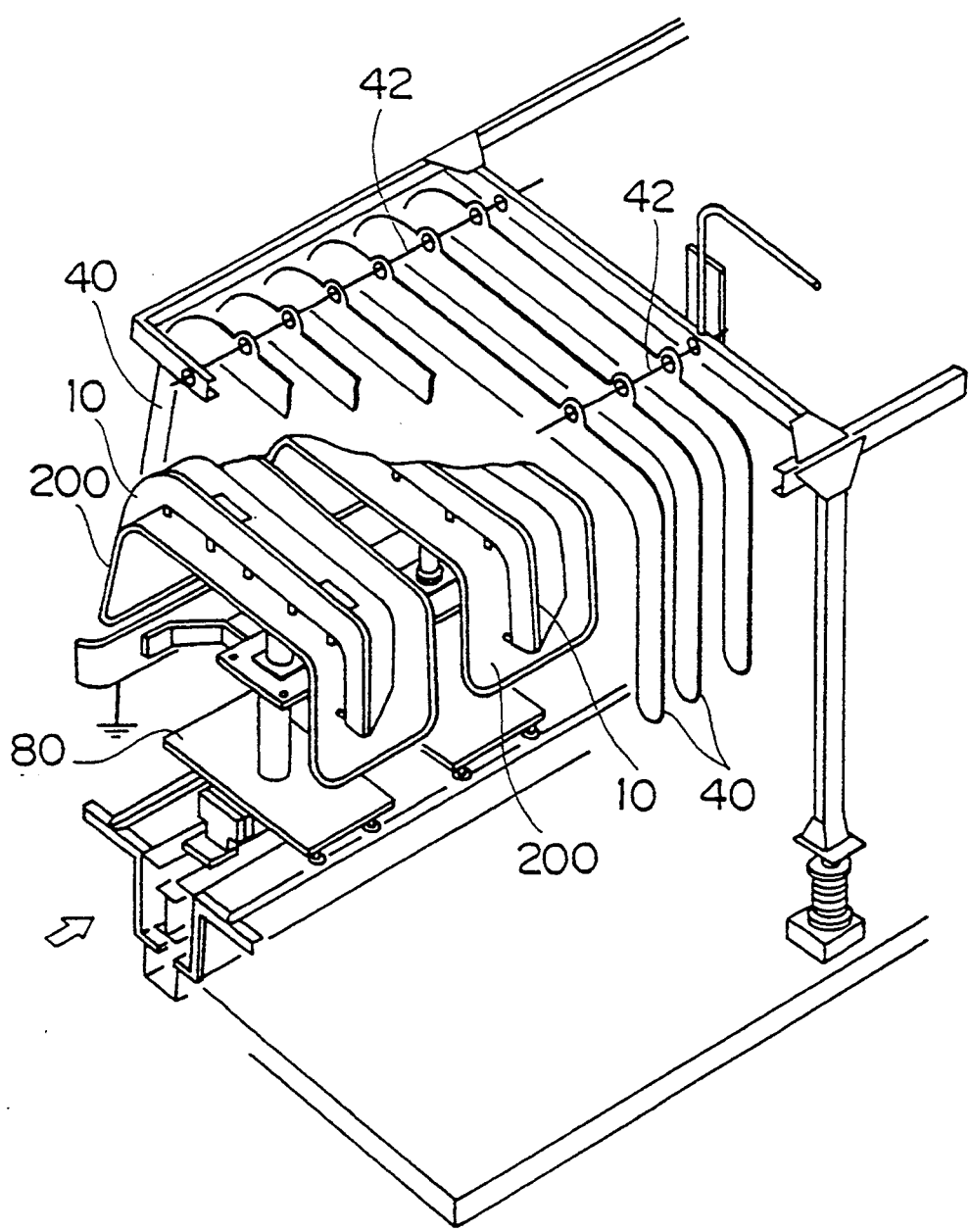
FIG. 16 shows the entire perspective diagram of a corona discharge processing apparatus described in the comparative example.

Using a comparative apparatus shown in FIG. 16, the procedure of examples 3 to 5 was repeated. Concerning the apparatus shown in FIG. 16, compared with that shown in FIG. 11, the counter-electrode 200 having a structure divided by each of individual supporting stands 80 is arranged and, when the supporting stands 80 move, the corona discharge processing is performed while the counter-electrode 200 and the resin formings 10 placed on this electrode 200 being transferred in order below the discharge electrode 40.

Thus, although corona discharge processing of the entire bumper was almost similar to the case of example 6, unstability on the discharge condition was recognized. Also, scattering in the measurement results of peeling strength was recognized. It is thought that the scattering was caused by some variation of the interelectrode distance between the counter-electrode 200 and discharge electrode 40 accompanied with transfer of the counter-electrode 200.

Accordingly, as shown in the examples of present invention, an apparatus in which the counter-electrode 20 and discharge electrode 40 are fixed and the resin formings 10 are transferred is proved to be superior in the uniformity of corona discharge processing.

What is claimed is:

1. A corona discharge processing method which comprises:

arranging a dielectric and resin forming having three-dimensional shapes between a discharge electrode and a counter-electrode, said dielectric interposed between said resin formings and said counter-electrode, and said dielectric having a break between said resin formings; and generating corona discharge by applying between both said electrodes a high voltage pulse having a pulse width of 1 μs or more, an average electric field strength of 6 to 20 kv/cm denoted by an applied voltage versus an interelectrode distance, and a pulse frequency of 10 pps or more thereby performing corona discharge processing on surfaces of said resin formings.

2. A corona discharge processing method as claimed in claim 1, wherein said dielectric has a thickness of 1 mm or more.

3. The corona discharge processing method of claim 1, wherein a distance between the discharge electrode and the counter-electrode is from 25 to 35 cm.

4. The corona discharge processing method of claim 3, wherein the average electric field strength is 7 to 10 kv/cm.

5. The corona discharge processing method of claim 1, wherein the applied voltage is from 120 to 300 kv.

6. The corona discharge processing method of claim 5, wherein the applied voltage is from 200 to 240 kv.

7. The corona discharge processing method of claim 1, wherein the pulse width of the applied voltage pulse is 2 to 20 μs.

8. The corona discharge processing method of claim 7, wherein the pulse width of the applied voltage pulse is from 3 to 10 μs.

9. A corona discharge processing apparatus which comprises a discharge electrode and a counter-electrode in opposition thereto, a high voltage-generating device which generates corona discharge with a high voltage between the discharge electrode and the counter-electrode, to thereby perform corona discharge processing on the surface of resin formings having three-dimensional shapes;

said corona discharge processing apparatus further comprising:

a transfer conveyor to hold the resin formings and transfer the resin formings in order in a predetermined direction;

a counter-electrode arranged along a transfer route of the resin formings, under the transfer conveyer in a position opposite to the lower end faces of the resin formings;

a dielectric covering a surface of the counter-electrode; and a plurality of discharge electrodes arranged above the transfer route of the resin formings in a position opposite to the upper end faces of the resin formings, and along the transfer route;

wherein said high voltage-generating apparatus further comprises a high voltage pulse-generating means for applying a high voltage pulse having a pulse width of 1 μs or more, an average electric field strength of 6 to 20 kv/cm denoted by an applied voltage versus an interelectrode distance, and a pulse frequency of 10 pps or more between the discharge electrodes and the counter-electrode.

10. A corona discharge processing apparatus which comprises a discharge electrode and a counter-electrode in opposition thereto, a high voltage-generating device which generates corona discharge with a high voltage between the discharge electrode and the counter-electrode, to thereby perform corona discharge processing on the surface of resin formings having three-dimensional shapes;

said corona discharge processing apparatus further comprising:

props on a plurality of supporting stands running in a predetermined direction, on upper ends of the props, a member for placing the resin formings, a counter-electrode along a transfer route of the resin formings positioned under the member for placing the resin formings in a position opposite to lower end faces of the resin formings, on the counter-electrode, a passing gap through which the props pass along a running route of the plurality of supporting stands, a dielectric covering a surface of the counter-electrode, and a plurality of discharge electrodes above the transfer route of the resin formings in a position opposite to upper end faces of the resin formings, and along the transfer route of the resin formings;

wherein said high voltage-generating apparatus further comprises a high voltage pulse-generating means for applying a high voltage pulse having a pulse width of 1 $\mu$s or more, an average electric field strength of 6 to 20 kv/cm denoted by an applied voltage versus an interelectrode distance, and a pulse frequency of 10 pps or more between the discharge electrodes and the counter-electrode.

11. A corona discharge processing apparatus as claimed in claim 10, wherein the props installed on the supporting stands are arranged so as to pivot in a direction along the passing gap, by using an installed part of the stand as a fulcrum.

12. The corona discharge processing apparatus of claim 10, wherein the gap extends in the direction of travel of the resin formings, and wherein the props extend through said gap for holding the resin formings between said discharge electrode and said counter-electrode, said props constructed so as to be capable of traveling along said gap, and said resin formings being constructed so as to pass between the discharge electrode and said counter-electrode.

* * * * *